United States Patent
Takasu et al.

(10) Patent No.: US 7,561,333 B2
(45) Date of Patent: Jul. 14, 2009

(54) METHOD FOR MANUFACTURING MOLD

(75) Inventors: Yoshifumi Takasu, Osaka (JP); Fuminori Takami, Osaka (JP)

(73) Assignee: Panasonic Corporation, Osaka (JP)

( * ) Notice: Subject to any disclaimer, the term of this patent is extended or adjusted under 35 U.S.C. 154(b) by 50 days.

(21) Appl. No.: 11/585,935

(22) Filed: Oct. 25, 2006

(65) Prior Publication Data

US 2007/0097492 A1    May 3, 2007

(30) Foreign Application Priority Data

Oct. 27, 2005    (JP)    ............................ 2005-312115

(51) Int. Cl.
*G02B 27/44* (2006.01)

(52) U.S. Cl. ..................................... 359/566

(58) Field of Classification Search ................ 359/566
See application file for complete search history.

(56) References Cited

U.S. PATENT DOCUMENTS 5,715,091 A * 2/1998 Meyers ........................ 359/565
2004/0125452 A1    7/2004 Cho et al.
2005/0162733 A1    7/2005 Cho et al.

FOREIGN PATENT DOCUMENTS

| CN | 1514266 | 7/2004 |
|---|---|---|
| JP | 2000-246614 | 9/2000 |
| JP | 2005-173597 | 6/2005 |

OTHER PUBLICATIONS

Chinese Office Action issued Jul. 11, 2008 in connection with Chinese Patent Application No. 200610142548.5 corresponding to the present U.S. patent application.

* cited by examiner

*Primary Examiner*—Joshua L Pritchett
(74) *Attorney, Agent, or Firm*—Wenderoth, Lind & Ponack, L.L.P.

(57) ABSTRACT

A mold manufacturing method for manufacturing a mold with which a diffractive lens array of high accuracy can be molded by the following steps: creating a set of coordinates of form points indicating a form of a concave portion which has a saw-toothed surface; deriving a set of coordinates of moving points by moving the coordinates of each of the form points; deriving an orbit for forming the concave portion, based on the moving points; and fabricating a metal mold by forming the concave portion which has a center that does not match a rotation center of the work piece, by moving a cutting tool along the orbit while rotating the work piece so as to cut the work piece.

4 Claims, 20 Drawing Sheets

FIG. 14

| E7a | $X = x7' + L\cos(\alpha - 45°)$, $Y = L\sin(\alpha - 45°)$, $Z = z7'$, $\theta = -45°$ |
|---|---|
| E7b | $X = x7' + L\cos(\alpha - 90°)$, $Y = L\sin(\alpha - 90°)$, $Z = z7'$, $\theta = -90°$ |
| E7c | $X = x7' + L\cos(\alpha - 135°)$, $Y = L\sin(\alpha - 135°)$, $Z = z7'$, $\theta = -135°$ |
| E7d | $X = x7' + L\cos(\alpha - 180°)$, $Y = L\sin(\alpha - 180°)$, $Z = z7'$, $\theta = -180°$ |
| E7e | $X = x7' + L\cos(\alpha - 225°)$, $Y = L\sin(\alpha - 225°)$, $Z = z7'$, $\theta = -225°$ |
| E7f | $X = x7' + L\cos(\alpha - 270°)$, $Y = L\sin(\alpha - 270°)$, $Z = z7'$, $\theta = -270°$ |
| E7g | $X = x7' + L\cos(\alpha - 315°)$, $Y = L\sin(\alpha - 315°)$, $Z = z7'$, $\theta = -315°$ |
| E7 | $X = x7' + L\cos(\alpha - 360°)$, $Y = L\sin(\alpha - 360°)$, $Z = z7'$, $\theta = -360°$ |

METHOD FOR MANUFACTURING MOLD

BACKGROUND OF THE INVENTION (1) Field of the Invention

The present invention relates to a method for manufacturing a mold for molding an optical element, and in particular to a method for manufacturing a mold through cutting.

(2) Description of the Related Art

Recently, with the increase in demand for high performance and miniaturization of an optical system, microlens arrays with plural lenses are gathering attention as important optical elements. For example, the microlens arrays are used for autofocus cameras. Among such microlens arrays, diffractive lens arrays have especially gathered more attention. This is because each lens of a diffractive lens array has a diffraction grating which has a bladed form (saw-toothed form), and is thin with high diffraction efficiency compared with a normal spherical or aspherical lens. Therefore, a lens shape of the microlens array that is in demand for increasing focusing accuracy shifts from a normal spherical or aspherical shape to a spherical shape (with diffraction element) or aspherical shape (with diffraction element) which has a saw-toothed surface.

Among the methods for manufacturing microlens arrays, methods based on lithography technology and methods based on machining technique are generally known (see Japanese Laid-Open Patent Application No. 2005-173597 and Japanese Laid-Open Patent Application No. 2000-246614).

According to the lithography technology described in Japanese Laid-Open Patent Application No. 2005-173597, a microlens array mold is fabricated by irradiating ultraviolet rays. In addition, the mold is pressed on to a polymer-coated glass board, and by irradiating ultraviolet rays onto the polymer, a microlens array is manufactured.

With the lithography technology described in the above-mentioned document, while a complex fine shape can be simultaneously formed in plural places, it is difficult to freely form a smoothly-curved surface. Thus, with the method based on the lithography technology, it is difficult to manufacture an optical element which satisfies the level of performance, such as a diffractive lens array that has both a smoothly-curved surface and a saw-toothed form and that requires high shaping accuracy.

According to the method based on the machining technique as described in Japanese Laid-Open Patent Application No. 2000-246614, a metal mold, having concave portions formed by cutting a work piece, is fabricated and a microlens array is manufactured using the metal mold. While a work piece is rotated, a cutting tool is moved so that a concave portion is formed in a position that deviates from the center.

With the method described in the above-mentioned document, a curved surface can be freely formed on a work piece, and thus it is possible to mold a microlens array having a smooth surface.

However, a problem is that even with the method described in Japanese Laid-Open Patent Application No. 2000-246614, a concave portion having a fine saw-toothed surface cannot be formed on a work piece. It is therefore not possible to mold a diffractive lens array of high accuracy.

To be more precise, an orbit along which a cutting tool should be moved is expressed as $(X, Y, Z) = (R\cos(\alpha-\theta)+x-tr\cos\beta, R\sin(\alpha-\theta), f(x)-d+tr\sin\beta-tr)$ in a function using a coordinate x and $\theta$ which denotes a rotation angle of the work piece. Note that the coordinate x indicates a coordinate, at which the cutting tool should be placed on a plane to be cut, of the work piece. The coordinate has the center of a concave portion as an origin. A concave portion is thus formed by cutting the work piece while moving the cutting tool along the orbit.

Thus, with the mold manufacturing method described in Japanese Laid-Open Patent Application No. 2000-246614, while the surface of the concave portion can be made smooth due to the movement of the cutting tool along the orbit, it is not possible to form a fine saw-toothed form. Therefore, it is not possible to mold a diffractive lens array of high accuracy.

SUMMARY OF THE INVENTION

The present invention is conceived in view of the above-mentioned problems, and an object of the present invention is to provide a method for manufacturing a mold with which a diffractive lens array of high accuracy can be molded.

In order to achieve the object, the mold manufacturing method according to the present invention is a method for manufacturing a mold, which includes: creating a set of form coordinates representing a concave or convex portion which has a saw-toothed surface; deriving a set of movement coordinates by moving the respective form coordinates; deriving an orbit for forming the concave or convex portion, based on the movement coordinates; and fabricating a mold by forming the concave or convex portion on or in a member by moving a cutting tool along the orbit while rotating the member so as to cut the member, the concave or convex portion having a center that does not match the rotation center of the member. For example, plural concave or convex portions are formed on the member.

Thus, with the deriving of plural types of orbits, a cutting tool moves along plural types of orbits. Therefore, it is possible to shape the surface of the concave or convex portion in a saw-toothed form having both a smooth curved surface and steep gullets. As a result, by molding an optical element using a mold having such a concave or convex portion, it is possible to manufacture a diffractive lens of high accuracy. In addition, a set of movement coordinates are derived by moving a set of form coordinates. It is possible to easily form the concave or convex portion as described above in an arbitrary part other than the rotation center of the member. Consequently, it is possible to have a variety of designs for the placement of diffractive lenses. Moreover, by forming plural concave or convex portions on the member, it is possible to easily mold a diffractive lens array of high accuracy. Furthermore, by increasing the number of movement coordinates or the number of orbits, it is possible to easily form the concave or convex portion of high accuracy, which results in the enhancement of the diffractive efficiency or focusing accuracy of diffractive lens array.

In addition, a mold is manufactured through cutting carried out by a cutting tool. It is therefore possible, compared to the manufacturing method based on the lithography technology, to widen the range of selection for a molding material and have variation in manufacturing methods, as well as to greatly reduce the number of processes required for manufacturing.

When deriving the orbit, the orbit derived may be an orbit which connects all the movement coordinates so as to draw a spiral from an outer periphery of the concave or convex portion toward the center.

Thus, it is possible to form a smoothly curved surface in the part of the surface of the concave or convex portion.

When deriving the movement coordinates, in the case where tr denotes a radius of a spherical tip of the cutting tool which makes contact with the member, the respective movement coordinates may be derived so that the distance between the neighboring movement coordinates on a plane vertical to the depth direction of cutting satisfies $(8 \cdot n \cdot tr)^{1/2}$, where $0 \leq n \leq 20 \times 10^{-9}$.

Thus, it is possible to further smoothen the curved surface of the concave or convex portion, and thus to enhance form accuracy of diffractive lens array.

Note that the present invention can be realized not only as such a mold manufacturing method, but also as a processing apparatus for fabricating a mold, as a method for manufacturing an optical element based on the mold manufacturing method, as an optical element manufactured based on the manufacturing method, and even as a program causing a processing apparatus to execute the mold manufacturing method, or as a storage medium storing the program.

The disclosure of Japanese Patent Application No. 2005-312115 filed on Oct. 27, 2005 including specification, drawings and claims is incorporated herein by reference in its entirety.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 14 is a diagram showing an example of control data;

DESCRIPTION OF THE PREFERRED EMBODIMENT(S)

The following describes a method for manufacturing an optical element according to the embodiment of the present invention with reference to the drawings.

According to the method for manufacturing an optical element according to the embodiment of the present invention, a metal mold of diffractive lens array is manufactured by cutting a work piece (molding member), and a diffractive lens array is molded using the metal mold. Here, the optical element manufacturing method according to the embodiment is characterized especially in the method for manufacturing a metal mold, or in other words, a method for controlling the processing apparatus which cuts a work piece.

Figure 1:
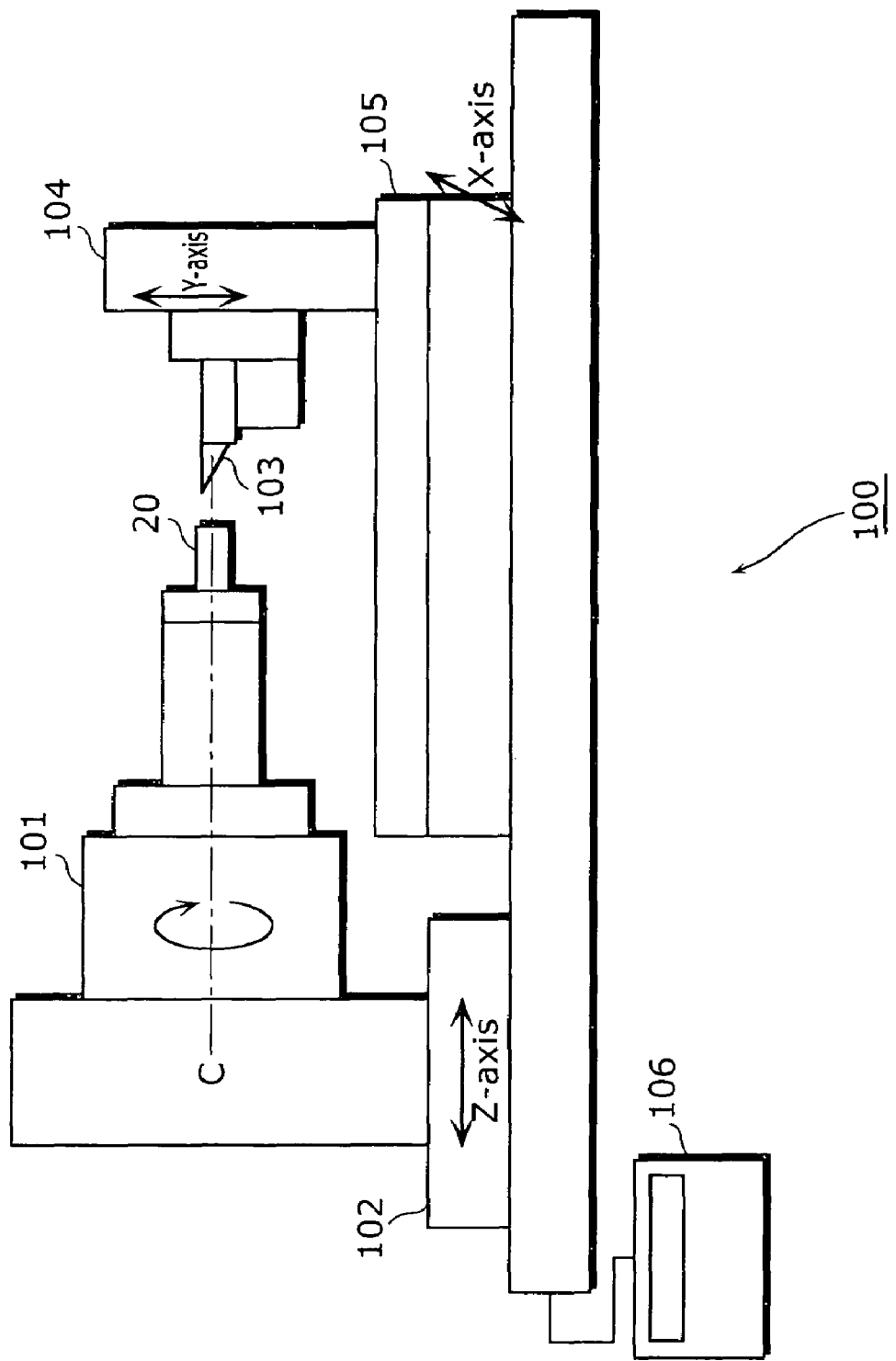
FIG. 1 is a lateral view of a processing apparatus according to the embodiment of the present invention.

FIG. 1 is a lateral view of a processing apparatus according to the embodiment of the present invention.

A processing apparatus 100 is comprised of a rotation driving unit 101 which rotates, around a rotation axis C, a work piece 20 that is placed on the tip of the rotation driving unit 101 on the rotation axis C; a Z-axis driving unit 102 which moves the work piece 20 placed on the rotation driving unit 101 in a direction along the rotation axis C (i.e. Z-axis direction); a Y-axis driving unit 104 which holds a cutting tool 103 and moves it in a direction vertical to the Z direction (Y-axis direction); an X-axis driving unit 105 which moves the cutting tool 103 held by the Y-axis driving unit 104 in a direction (X-axis direction) vertical to the respective Z and Y directions; and an NC control unit 106 which controls the rotation driving unit 101, the X-axis driving unit 105, the Y-axis driving unit 104 and Z-axis driving unit 102.

The work piece 20 is formed by coating a hard metal with electroless nickel. Note that the work piece 20 may be made of oxygen free copper, brass, aluminum alloy, hard metal, resin or glass.

The cutting tool 103 is what is known as a diamond bit, and the tip of the cutting tool 103 that contacts the work piece 20 is formed in spherical shape (R shape).

The NC control unit 106 moves the position of the tip of the cutting tool 103 with respect to the work piece 20 along the directions of three axes (X, Y and Z axes) by controlling the rotation driving unit 101, the X-axis driving unit 105, the Y-axis driving unit 104 and the Z-axis driving unit 102, as well as rotates the work piece 20 around the rotation axis C. As a result, a part of the work piece 20, to be cut is cut by the tip of the cutting tool 103. Also, the NC control unit 106 allows the rotation by the rotation axis driving unit 101, the movements of the X-axis driving unit 105, the Y-axis driving unit 104 and the Z-axis driving unit 102 to be executed with submicron accuracy (accuracy of less than 1 μm) or nano accuracy (accuracy of less than 1 nm).

Figure 2:
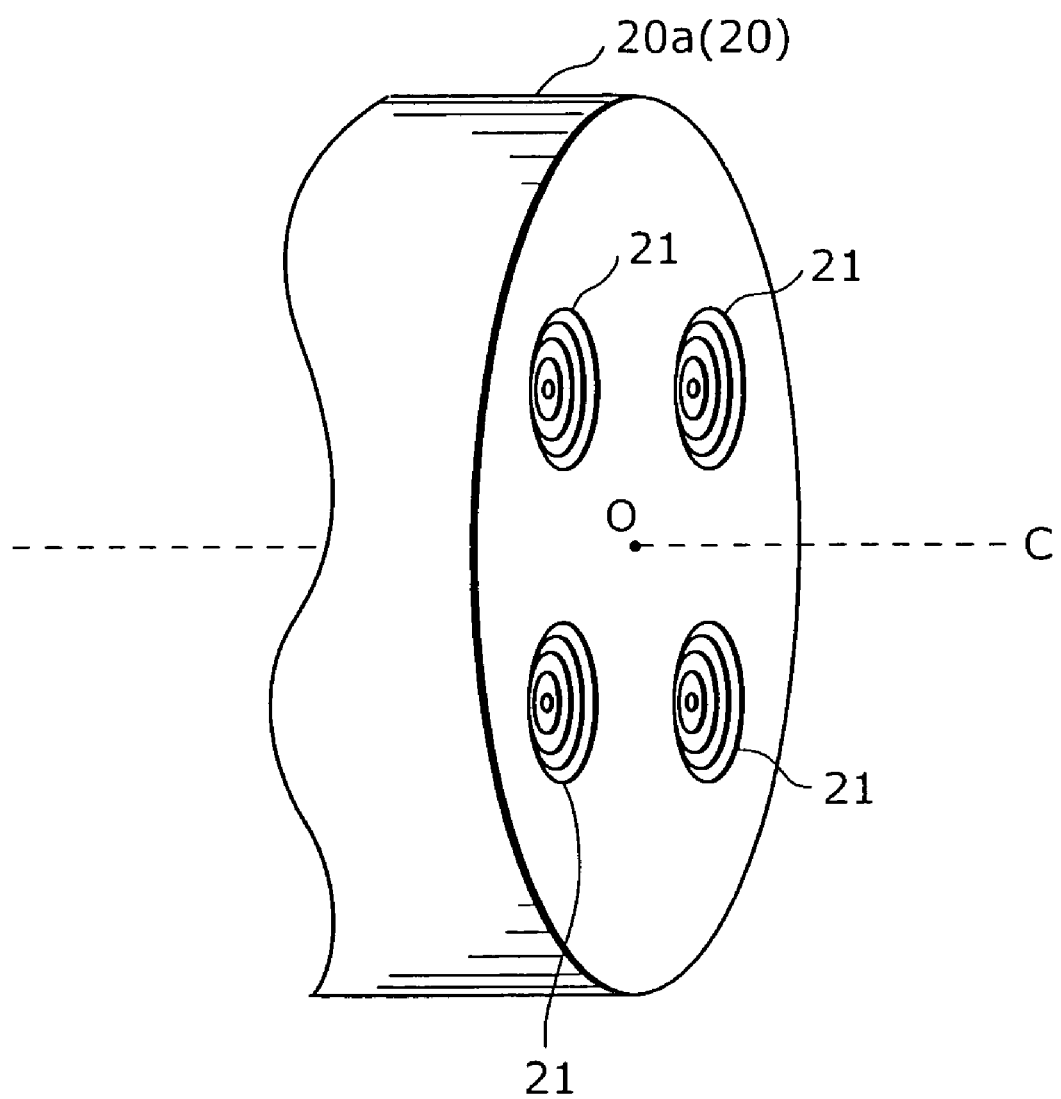
FIG. 2 is an external view of a work piece (a metal mold of a diffractive lens array) cut by the processing apparatus.

FIG. 2 is an external view of a work piece (a metal mold of diffractive lens array) cut by the processing apparatus 100.

The processing apparatus 100 fabricates a metal mold 20a of diffractive lens arrays by cutting the work piece 20. On the metal mold 20a of diffractive lens arrays, four concave portions 21, for instance, are formed. These concave portions 21 are arranged at regular intervals along a circumference having, in the center, an intersection O of the surface of the metal mold 20a and the rotation axis C.

Figure 3:
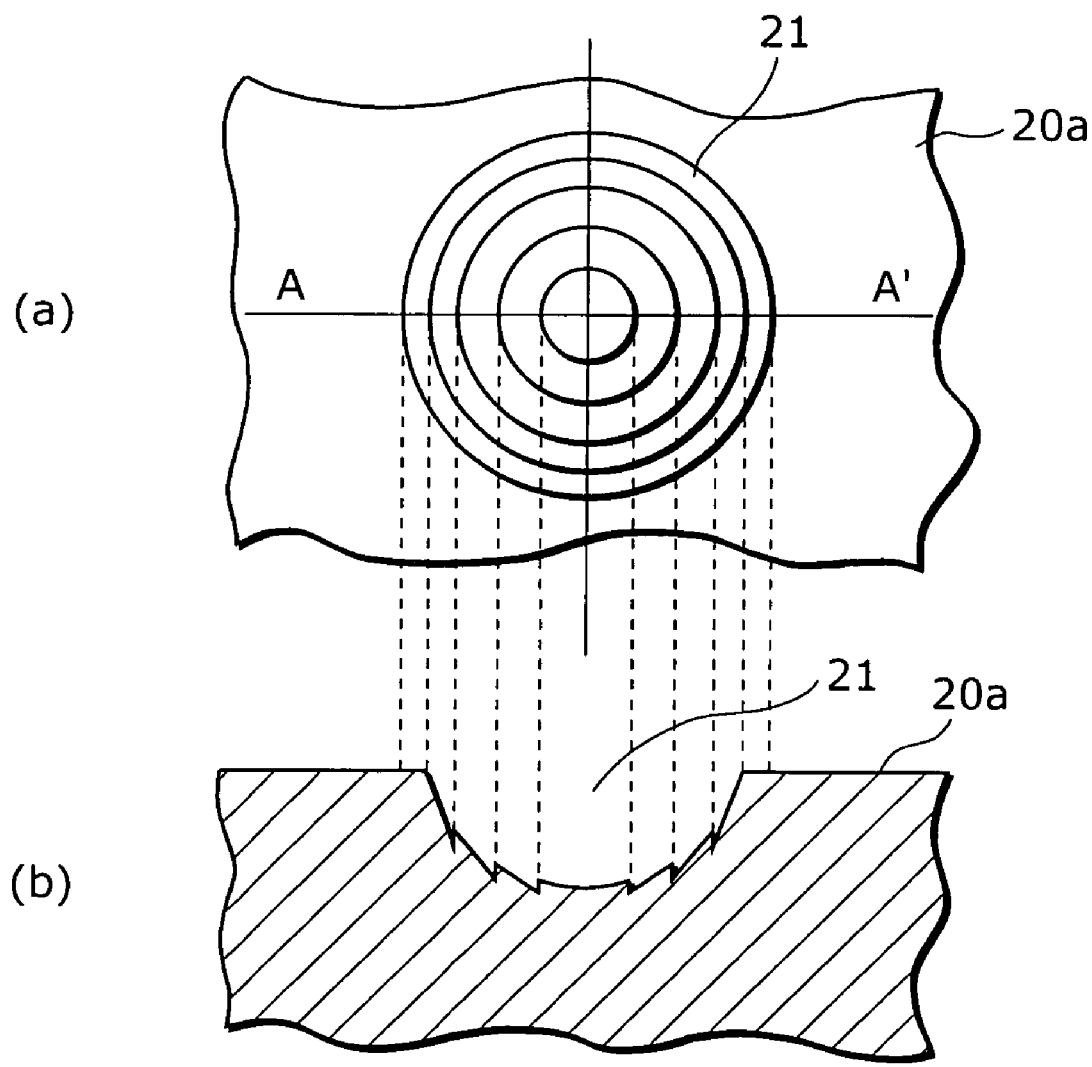
FIG. 3 shows a front view and a cross-sectional view of a concave portion of a metal mold of diffractive lens array.

FIG. 3 is a front view and a cross-sectional view showing the concave portion 21 of the metal mold 20a of diffractive lens arrays.

As shown in (a) in FIG. 3, an aperture area of the concave portion 21 is almost in a circular form, and the concave portion 21 has a saw-toothed surface and is formed almost in a spherical form, as shown in (b) in FIG. 3. Note that (b) in FIG. 3 shows a cross-section A-A' of the metal mold 20a shown in (a) in FIG. 3.

Figure 4:
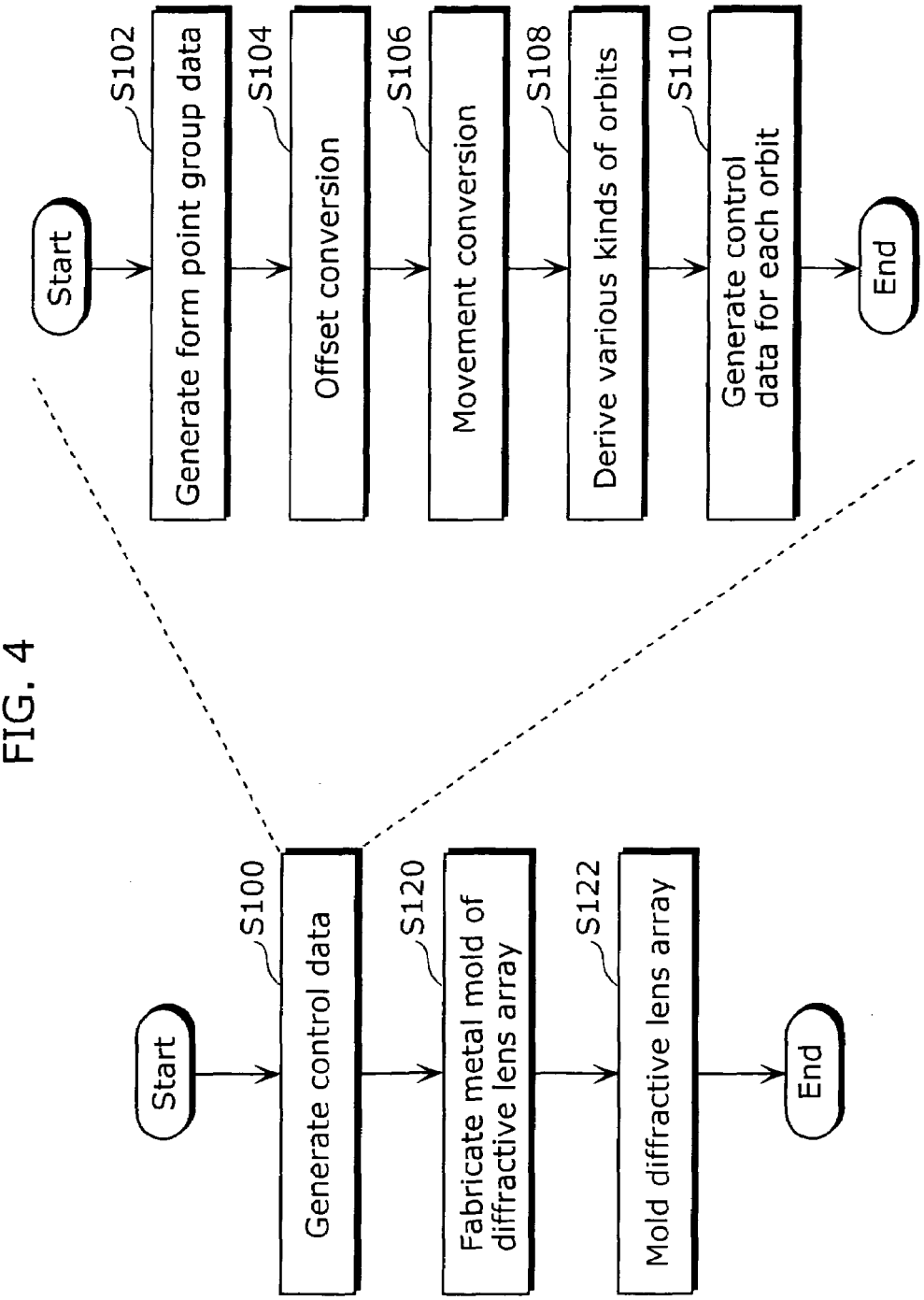
FIG. 4 is a flowchart showing a method for manufacturing diffractive lens arrays.

FIG. 4 is a flowchart showing a method for manufacturing a diffractive lens array according to the embodiment.

Firstly, the NC control unit 106 of the processing apparatus 100 generates control data indicating coordinates of plural control points along which the tip of the cutting tool 103 has to move (Step S100). The NC control unit 106 then controls the rotation driving unit 101, the X-axis driving unit 105, the Y-axis driving unit 104 and the Z-axis driving unit 102 so that the tip of the cutting tool 103 (center of the R shape) moves along the control points, while rotating the work piece 20. Thus, the processing apparatus 100 cuts the work piece 20 with the cutting tool 103, and forms the concave portion 21 whose surface is saw-toothed, in the part other than the center of the rotation (intersection O shown in FIG. 2) of the work piece 20. Here, the center of the rotation of the work piece 20 does not match the center of the concave portion 21. Moreover, the processing apparatus 100 fabricates the metal mold 20a of diffractive lens arrays, as shown in FIG. 2, by forming such concave portions 21 (Step S120).

Lastly, a diffractive lens array is injection-molded by pouring resin and glass materials into such a metal mold 20a (Step S122).

In order to generate the control data, the NC control unit 106 firstly sets, as an origin, the intersection O of the rotation axis C and the plane to be cut, of the work piece 20. The NC control unit then generates, as form point group data, coordinates $(x_n, z_n)$ (n=1, 2, ..., N) of N form points indicating the saw-toothed form of the concave portion 21 located in the origin O (Step S102). Note that such form points are called "form point group".

Next, the NC control unit 106 converts the coordinates $(x_n, z_n)$ of each form point of the form point group data into coordinates $(x_n', z_n')$ of offset points, by offsetting the size of the tip of the cutting tool 103 for the coordinates $(x_n, z_n)$ of each form point of the form point group data (Step S104). In other words, the NC control unit 106 creates the coordinates (placement coordinates) of the offset points in which the tip of the cutting tool 103 (center of the R shape) shall be placed, based on the coordinates of the form points. Hereinafter, such a conversion is referred to as "offset conversion" and offset points are referred to as "offset point group".

Here, the coordinates $(x_n', z_n')$ of each of the offset points derived through the offset conversion indicate a position in which the tip of the cutting tool 103 should be located in the case where the concave portion 21 is formed in the origin O. Therefore, in the case of generating the concave portion 21 in a position deviated from the origin O (an eccentric point), the coordinates $(x_n', z_n')$ OF each of the offset points need to be converted according to the eccentric point.

The NC control unit 106 converts the coordinates $(x_n', z_n')$ into coordinates $(x_n'', Y_n'', z_n'')$ of each of the moving points corresponding to the position of the concave portion 21 located in the eccentric point, by parallely shifting the coordinates $(x_n', z_n'')$ of each of the offset points derived under the assumption that the concave portion 21 is located in the origin O (Step S106). Hereinafter, such a conversion is referred to as "movement conversion".

Then, in order to synchronize the movement of the tip of the cutting tool 103 in the X-axis, Y-axis and Z-axis directions with the rotation by the rotation driving unit 101, the NC control unit 106 derives, as a function of the rotation angle θ, an orbit $(x_n(\theta), Y_n(\theta), z_n(\theta))$ along which the tip of the cutting tool 103 should be moved based on the coordinates $(x_n'', Y_n'', z_n'')$ of each of the moving points (Step S108). Here, the plural types of orbits derived are orbits formed by joining each of the moving points, and are represented as functions which are different from each other according to the movement (sun-and-planet motion) of the tip of the cutting tool 103.

In addition, by substituting a value of the rotation angle θ in the orbit $(x_n(\theta), Y_n(\theta), z_n(\theta))$ for each of the orbits, the NC control unit 106 derives the coordinates of the control points along which the tip of the cutting tool 103 should be moved (Step S110).

Figure 5:
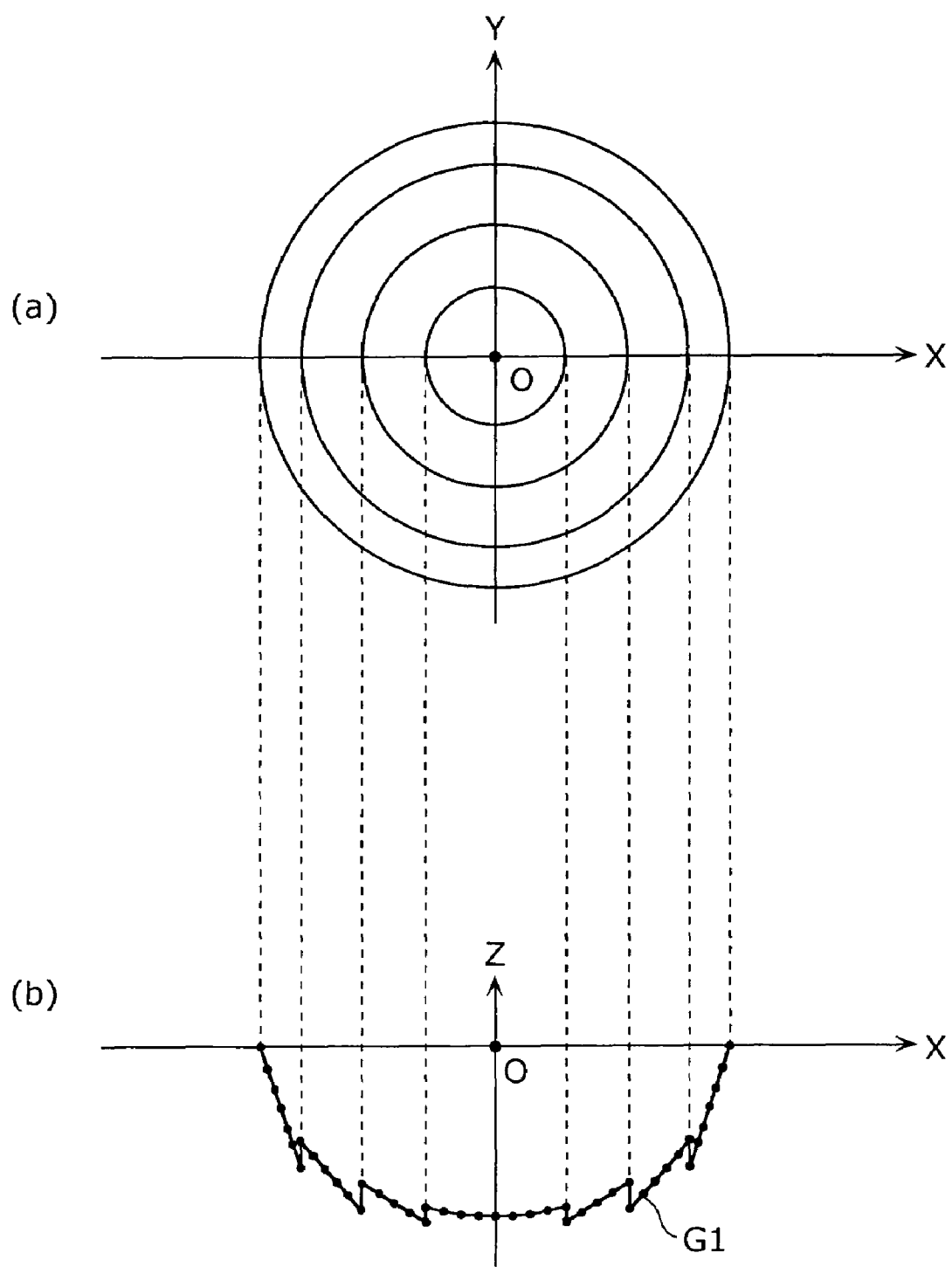
FIG. 5 is a diagram showing a form point group.

FIG. 5 is a diagram showing a form point group.

In the case where the concave portion 21 is represented on the X-Y coordinates in the form as shown in (a) in FIG. 5, a form point group G1 is placed on the X-Z coordinates so as to form an ideal saw-toothed form, as shown in (b) in FIG. 5.

In other words, the NC control unit 106 places, on the X-Z coordinates as shown in (b) in FIG. 5, the form point group G1 indicating the form of the concave portion 21 of the metal mold 20a which fits in a diffractive lens, based on the data indicating the shape of the diffractive lens. Note that the origin O of the X-Z coordinates is an intersection of the rotation axis C and a plane to be cut, of the work piece 20. Thus, the form point group data, which indicates the coordinates $(x_n, z_n)$ of each of the form points, is created.

Figure 6:
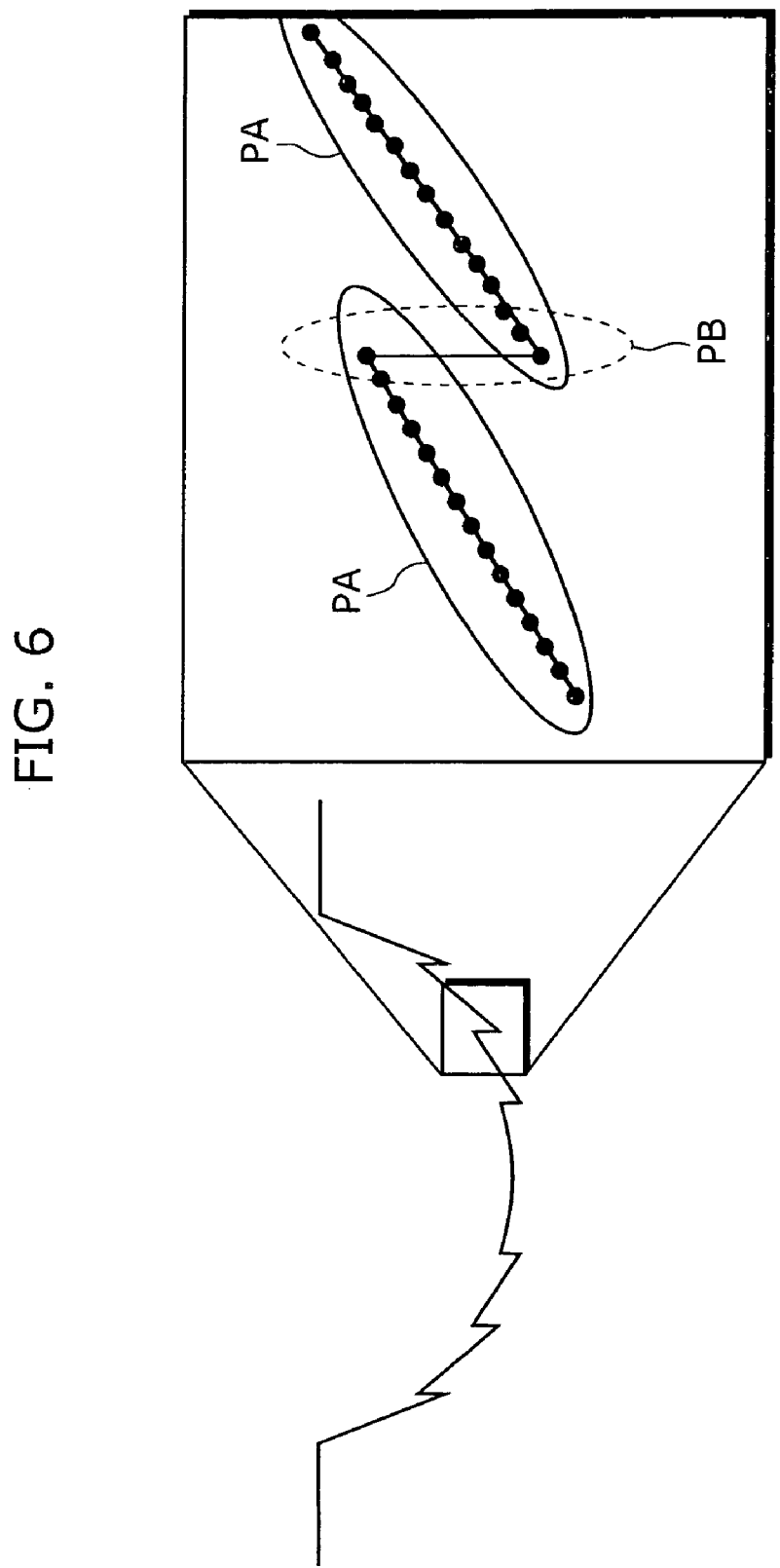
FIG. 6 is a diagram illustrating how an NC control unit processes a form point group.

FIG. 6 is a diagram illustrating how the NC control unit 106 processes the form point group G1.

The NC control unit 106 processes each of the form points shown in (b) in FIG. 5 by grouping them into plural sequence parts PA. A sequence part PA includes plural form points, and a smooth curved surface of the concave portion 21 is represented by these form points. Also, the NC control unit 106 regards two form points, of the form points included in the respective neighboring sequence parts PA, having identical or approximate X coordinate as a step part PB. The step part PB represents a non-sequential plane of the concave portion 21.

The NC control unit 106 converts, per sequence part PA, the coordinates $(x_n, z_n)$ of each of the form points included in the sequence part PA into the coordinates $(x_n', z_n')$ of each of the offset points, using the following expressions (Expression 1) and (Expression 2).

$$x_n'=((-tr \times a)+(tr+r)\times x_n)/r \quad \text{(Expression 1)}$$

$$z_n'=((-tr \times b)+(tr+r)\times z_n)/r \quad \text{(Expression 2)}$$

The sign "r" denotes a radius of a circle that passes three form points of $(x_n, z_n)$, $(x_{n+1}, z_{n+1})$, $(x_{n+2}, z_{n+2})$, while (a, b) denotes coordinates of the center of the circle, and the sign "tr" denotes a radius of the tip of the R shape of the cutting tool 103.

Figure 7:
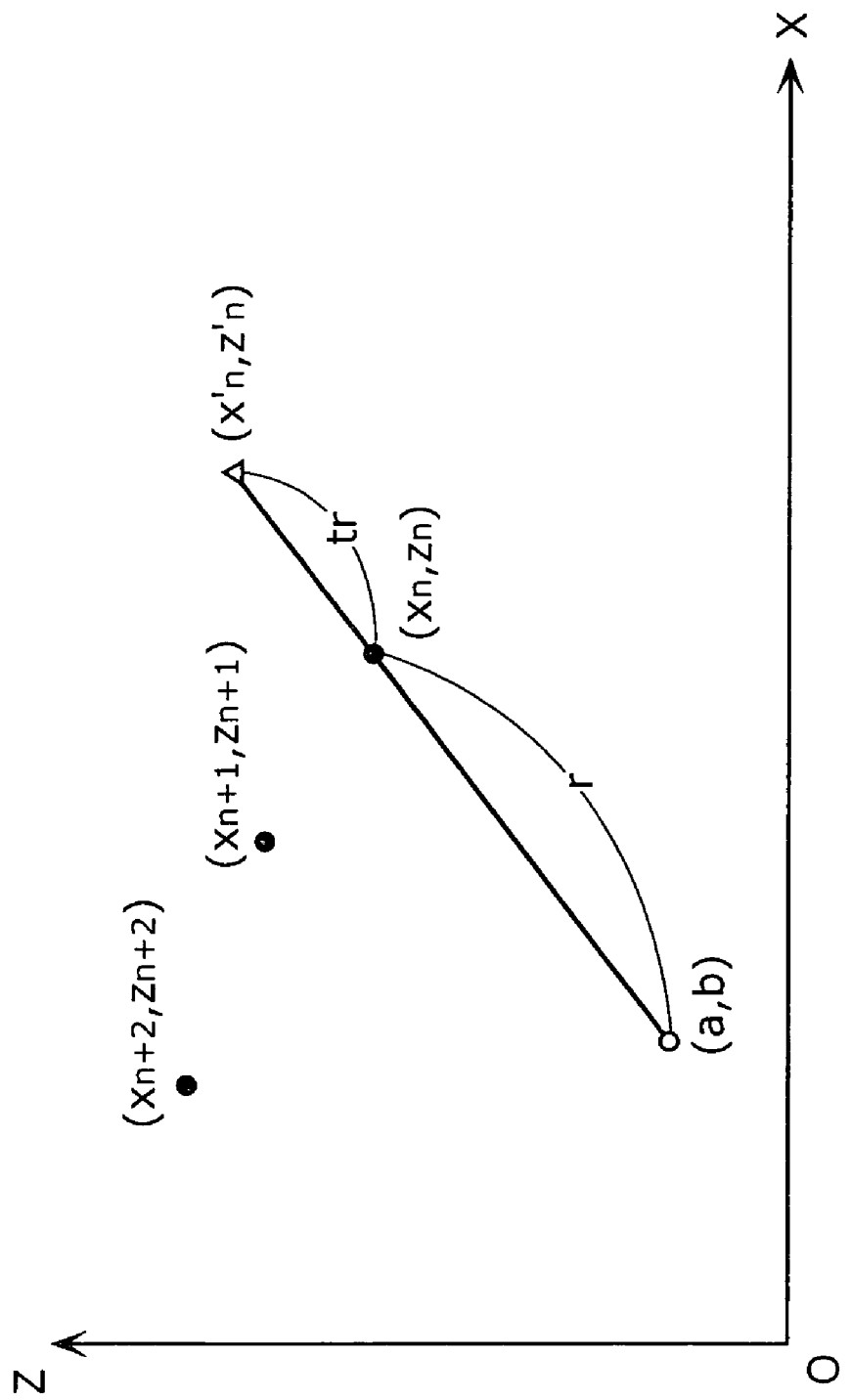
FIG. 7 is a diagram illustrating offset conversion.

FIG. 7 is a diagram illustrating a process of performing offset conversion on the coordinates $(x_n, z_n)$ and $(x_n', z_n')$.

When performing offset conversion on the coordinates $(x_n, z_n)$, the NC control unit 106 firstly calculates the coordinates (a, b) of the center of the circle and the radius r of the circle that passes the form points of $(x_n, z_n)$, $(x_{n+1}, z_{n+1})$, $(x_{n+2}, z_{n+2})$.

The NC control unit 106 then performs offset conversion on the coordinates $(x_n, z_n)$ and $(x_n', z_n')$ based on the expressions (Expression 1) and (Expression 2) using the coordinates (a, b) and the radius r of the circle which are calculated as described above.

The NC control unit 106 performs such offset conversion on each of the form points of the form point group data.

In addition, the NC control unit 106 derives, through the offset conversion, the coordinates $(x_m', z_m')$ (m=1, 2, ..., M)

of a diffraction point with respect to each step part PB. Note that M denotes a total number of the steps of the diffractive lens.

Figure 8:
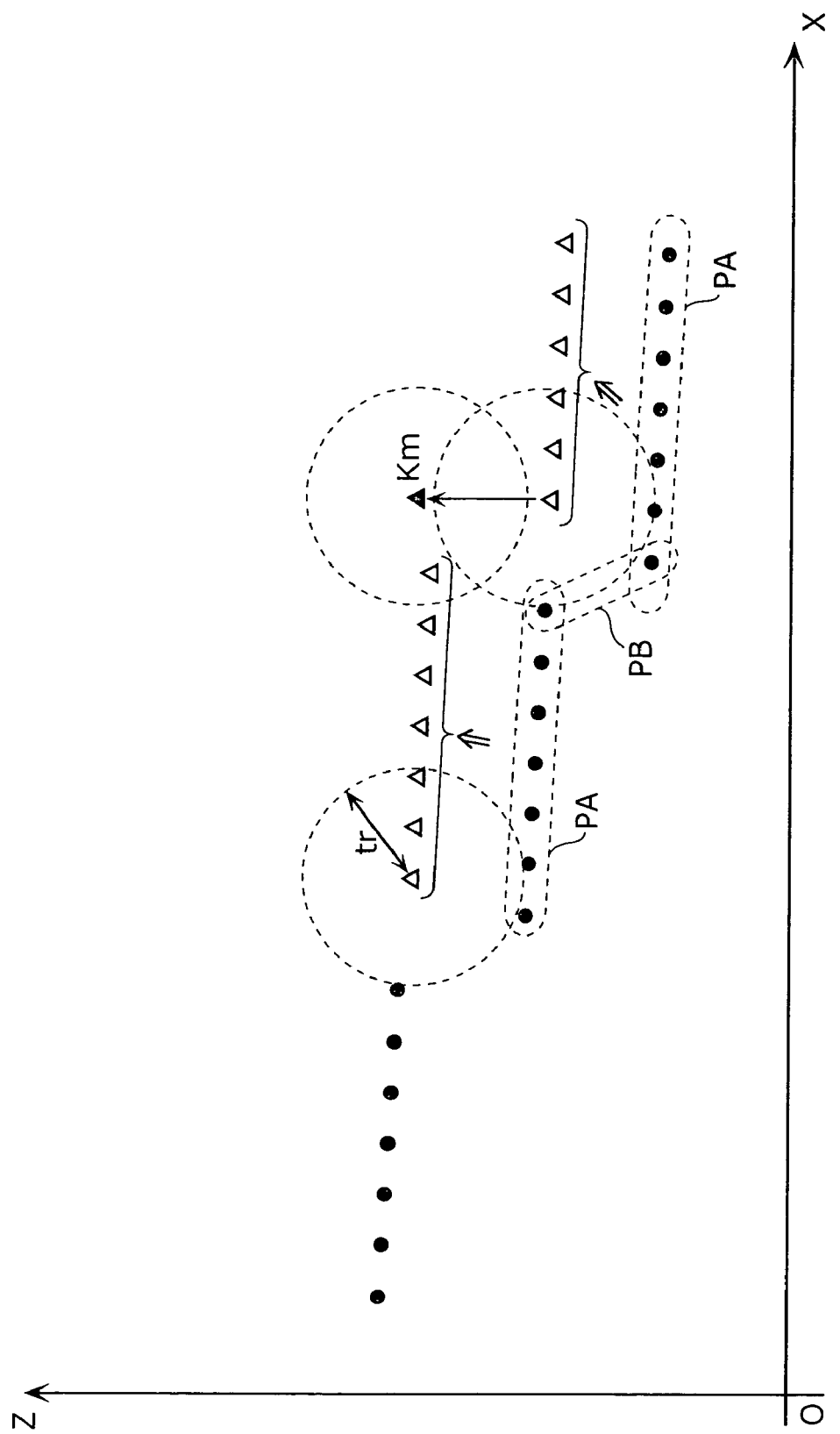
FIG. 8 is a diagram illustrating a diffraction point.

FIG. 8 is a diagram illustrating a diffraction point.

As described above, the NC control unit 106 converts the coordinates $(x_n, z_n)$ of the form points in each sequence part PA into the coordinates $(x_n', z_n')$. In some cases, however, as the center of the tip of the cutting tool 103 moves according to the coordinates $(x_n', z_n')$, the Z coordinate of the tip of the cutting tool 103 becomes smaller than the Z coordinate of the form point indicating the form of the concave portion 21, in the step part PB. That is to say that the cutting tool 103 cuts the work piece 20 too much in some cases.

The NC control unit 106 therefore derives, for each sequence part PA, the coordinates $(x_m', z_m')$ of a diffraction point Km (a black triangle shown in FIG. 8) for which only the Z coordinate is increased, with respect to the coordinates $(x_n', z_n')$ whose X coordinate is the nearest to the origin O among the previously-derived offset points (white triangles shown in FIG. 8).

The NC control unit 106 processes the diffraction points Km indicated by the coordinates $(x_m', z_m')$ as offset points, as is the case of the points indicated by the coordinates $(x_n', z_n')$ derived using Expression 1 and Expression 2.

Figure 9:
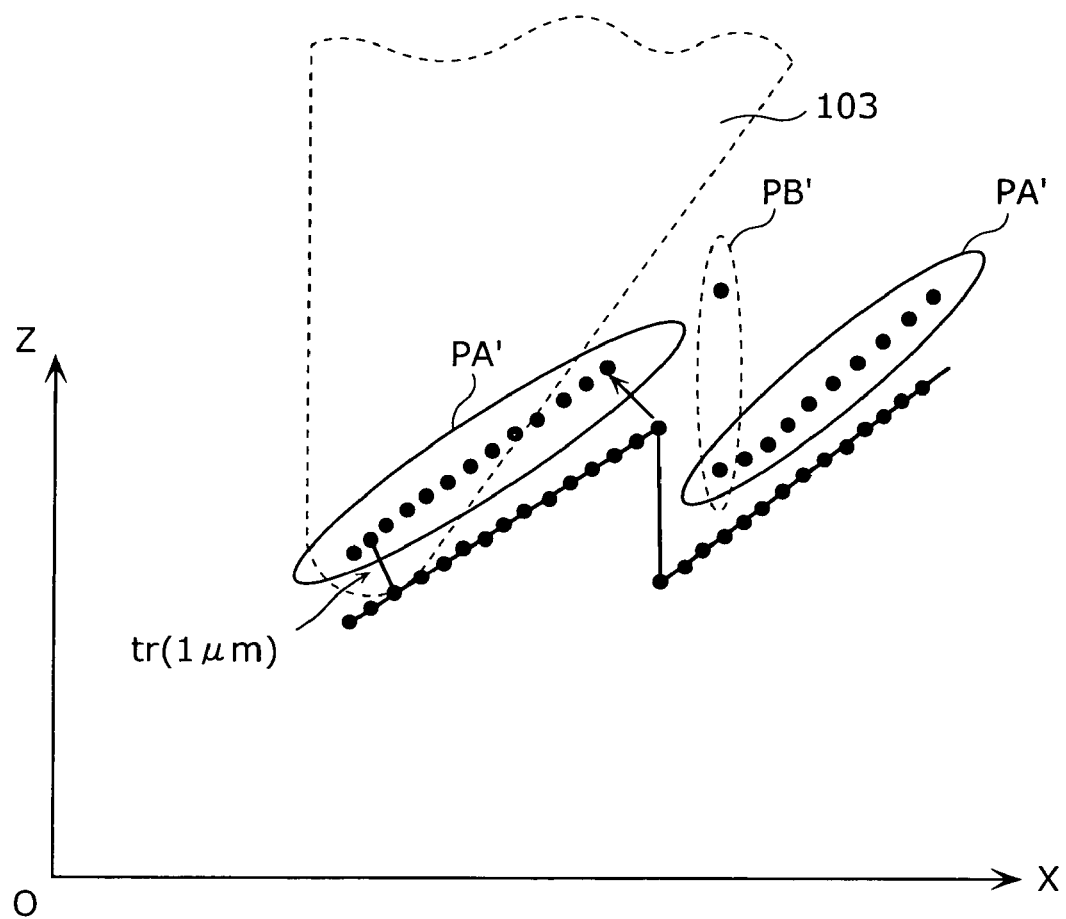
FIG. 9 is a diagram showing form points of form point group data, and offset points derived through offset conversion.

FIG. 9 is a diagram showing form points of the form point group data, and offset points derived through offset conversion.

The form points in the sequence part PA are converted into offset points in an offset sequence part PA', and the form points in the step part PB are converted into offset points in an offset step part PB'. Note that the offset point with the bigger Z coordinate out of the two offset points in the offset step part PB' is the diffraction point Km as described above.

For example, in the case where a distance (height of step) between the two form points included in the step part PB is 3 µm, a cutting tool 103 with the tip whose radius (tr) is 1 µm is used. In this case, the offset sequence part PA' is distant from the sequence part PA by 1 µm in normal direction.

Figure 10:
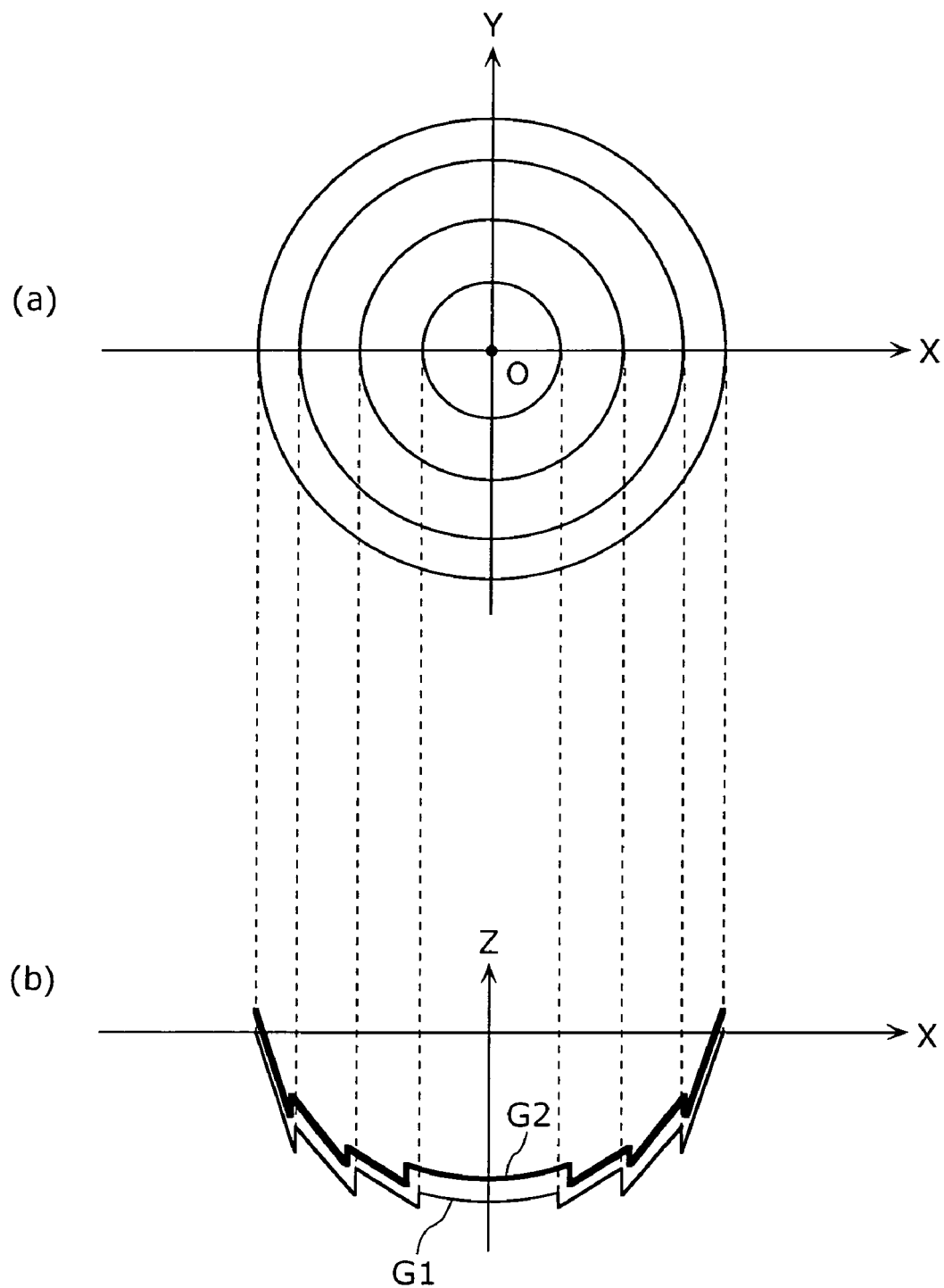
FIG. 10 is a diagram showing an overall placement of a form point group and an offset point group.

FIG. 10 is a diagram showing an overall placement of the form point group G1 and an offset point group.

In the case where the concave portion 21 has the form represented on X-Y coordinates as shown in (a) in FIG. 10, the NC control unit 106 places an offset point group G2 on the side where the Z coordinate is larger than that of the form point group G1, on the X-Z coordinates, as shown in (b) in FIG. 10, by performing the offset conversion as described above.

Figure 11:
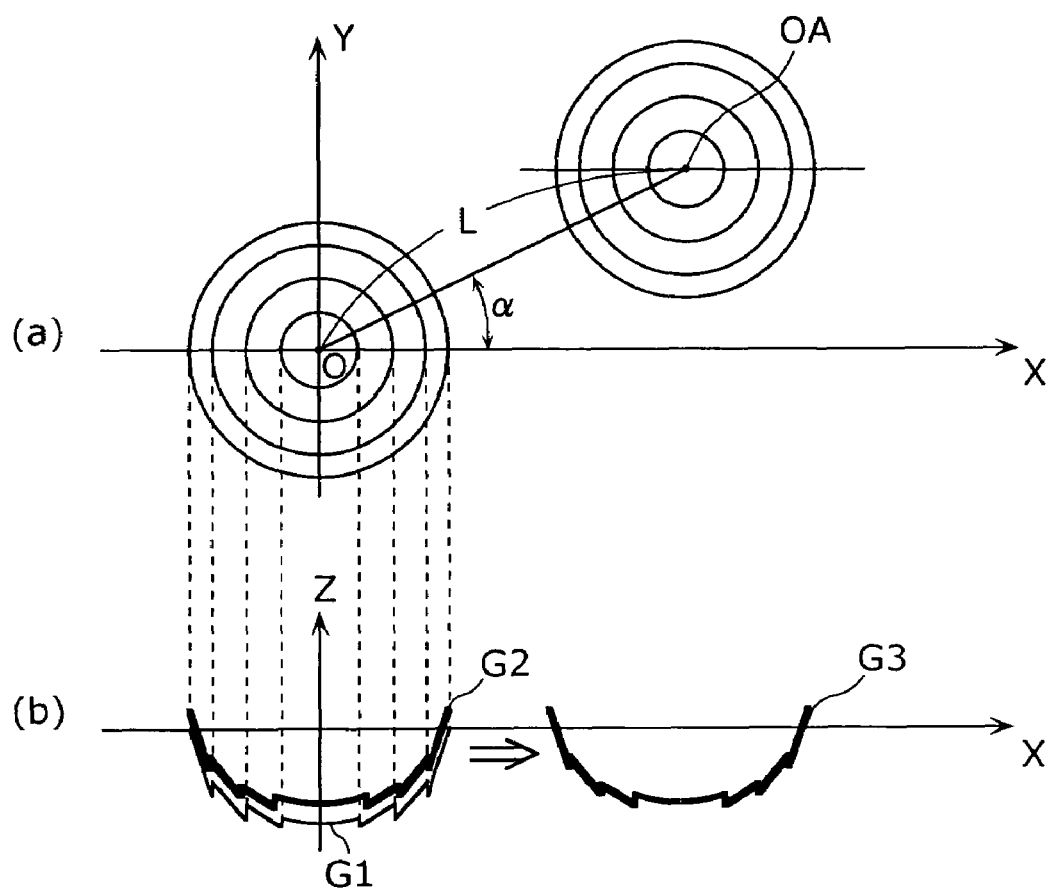
FIG. 11 is a diagram illustrating movement conversion.

FIG. 11 is a diagram illustrating movement conversion.

As described above, in the case of forming the concave portion 21 at the intersection (origin O) of the rotation axis C and the plane to be cut, of the work piece 20, the coordinates of each of the offset points indicate the coordinates in which the tip (center of the R shape) of the cutting tool 103 should be located. Therefore, in order to form the concave portion 21 at the eccentric point OA that is different from the origin O, the NC control unit 106 converts the coordinates $(x_n', z_n')$ and $(x_m', z_m')$ of each of the offset points into the coordinates $(x_n'', Y_n'', z_n'')$ and $(x_m'', Y_m'', z_m'')$ of the moving points represented by X-Y-Z coordinates. Note that the coordinates $(x_m'', Y_m'', z_m'')$ of the moving points are the coordinates derived by converting the coordinates $(x_m', z_m')$ of the diffraction point out of the offset points.

Hereinafter, in the case of not differentiating the coordinates $(x_n', z_n')$ and $(x_m', z_m')$ of offset points, these coordinates are represented as $(x_{n+m}', z_{n+m}')$. Likewise, in the case of not differentiating the coordinates $(x_n'', Y_n'', z_n'')$ and $(x_m'', Y_m'', z_m'')$ of moving points, these coordinates are represented as $(x_{n+m}'', Y_{n+m}'', z_{n+m}'')$.

For example, the eccentric point OA is distant from the origin O by a distance L, and a line connecting the origin O and the eccentric point OA is tilted with respect to the X axis by an angle α, as shown in (a) in FIG. 11. In such a case, the coordinates of the eccentric point OA is expressed by the expression (Expression 3) indicated below.

$OA(X,Y)=(L \cdot \cos α, L \cdot \sin α)$ (Expression 3)

Therefore, the coordinates of each of the moving points are expressed by the expression (Expression 4).

moving point$(X,Y,Z)=(x_{n+m}'', Y_{n+m}'', z_{n+m}'')=(x_{n+m}'+L \cdot \cos α, L \cdot \sin α, z_{n+m}')$ (Expression 4)

In other words, the offset point group G2 shifts parallel in the X-axis direction as well as in Y-axis direction, as shown in (b) in FIG. 11, and is regarded as a moving point group G3 being an assembly of plural moving points.

When deriving plural kinds of orbits, the NC control unit 106 derives the orbits as functions of a rotation angle θ which are different from one another according to the first, second and third sun-and-planet motions of the tip of the cutting tool 103.

The first sun-and-planet motion is a movement, along the rotation of the work piece 20, in which the tip of the cutting tool 103 moves on the X-Y coordinates along a spiral from the outer periphery of the concave portion 21 toward the eccentric point OA and the cutting tool 103 cuts deeply in the Z axis direction.

The second sun-and-planet motion is a movement, along the rotation of the work piece 20, in which the tip of the cutting tool 103 moves on the X-Y coordinates along the periphery having the eccentric point OA in the center while the Z coordinate is kept to be the same.

The third sun-and-planet motion is a movement in which the tip of the cutting tool 103 moves along a spiral having the eccentric point OA in the center. In other words, the tip of the cutting tool 103 moves on the X-Y coordinates along the periphery having the eccentric point OA in the center, and also gets away from the work piece 20 in the Z-axis direction.

Figure 12:
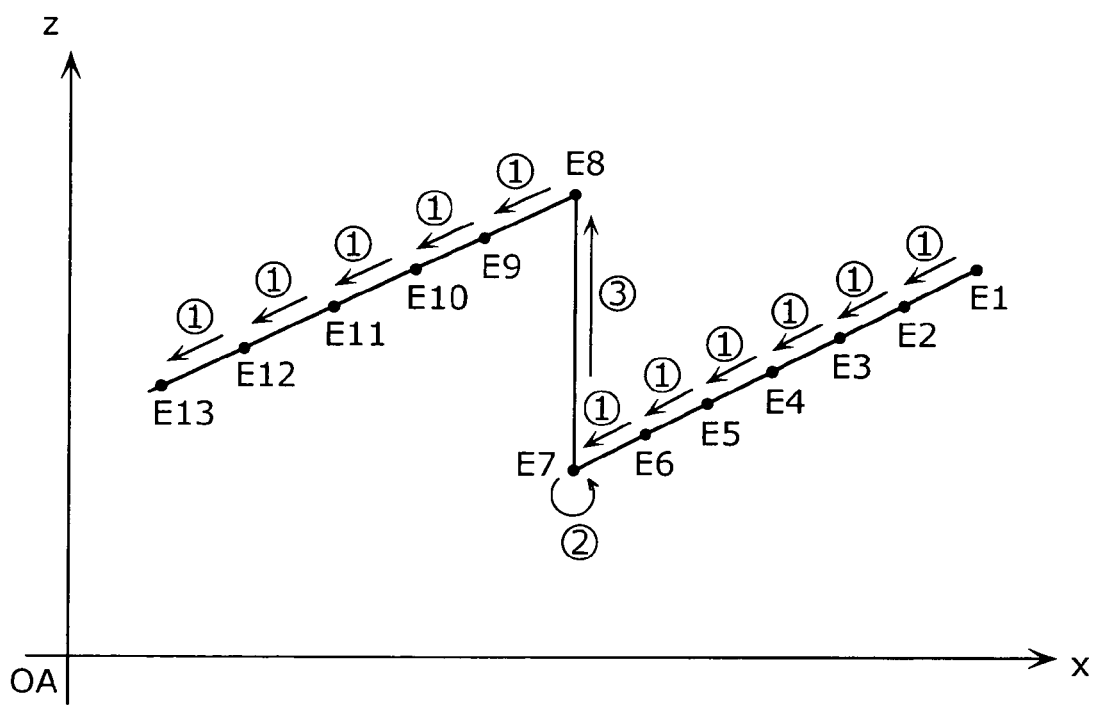
FIG. 12 is a diagram illustrating first, second and third sun-and-planet motions.

FIG. 12 is a diagram illustrating the first, second and third motions. Note that in FIG. 12, each of the moving points E1 through E13 are placed on the x-z coordinates having the eccentric point OA as an origin.

The NC control unit 106 firstly allows the tip of the cutting tool 103 to perform the first sun-and-planet motion while allowing the work piece 20 to spin around 360 degrees. In other words, the NC control unit 106 allows, for each rotation of the work piece 20, the tip of the cutting tool 103 to move from the moving point E1 to the moving point E2, from the moving point E2 to the moving point E3, and then to the moving point E7 so that the value of the Z coordinate gets smaller along the spiral, on the X-Y plane, having the eccentric point OA in the center.

When the tip of the cutting tool 103 reaches the moving point E7, the NC control unit 106 allows the tip of the cutting tool 103 to perform the second sun-and-planet motion while allowing the work piece 20 to spin around 360 degrees. In other words, the NC control unit 106 allows the tip of the cutting tool 103 to move for one round from the moving point E7 back to the moving point E7 along the periphery having the eccentric OA in the center, while allowing the work piece 20 to spin around 360 degrees.

When the tip of the cutting tool 103 goes round, the NC control unit 106 allows the tip of the cutting tool 103 to perform the third sun-and-planet motion while allowing the work piece 20 to spin around 360 degrees. That is to say that the NC control unit 106 allows the tip of the cutting tool 103 to move from the moving point E7 to the moving point E8 along a spiral having the eccentric point OA in the center, while allowing the work piece 20 to spin around 360 degrees.

When the tip of the cutting tool 103 reaches the moving point E8, the NC control unit 106 allows the tip of the cutting tool 103 to perform the first sun-and-planet motion sequentially from the moving point 8 to the moving point E13, as described above.

The NC control unit 106 derives an orbit required for causing the tip of the cutting tool 103 to execute each of the sun-and-planet motions using the coordinates of each of the moving points for each of the sun-and-planet motions.

Figure 13A:
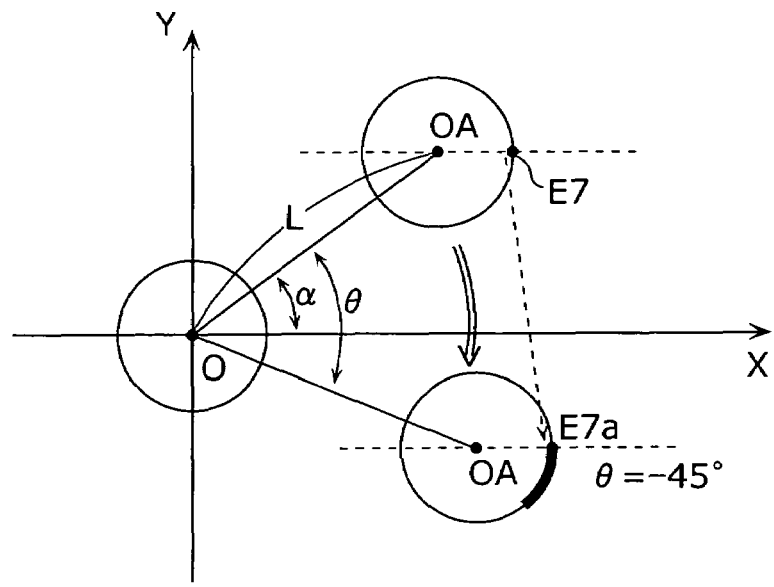
FIG. 13A is a diagram showing an orbit of the second sun-and-planet motion.
Figure 13B:
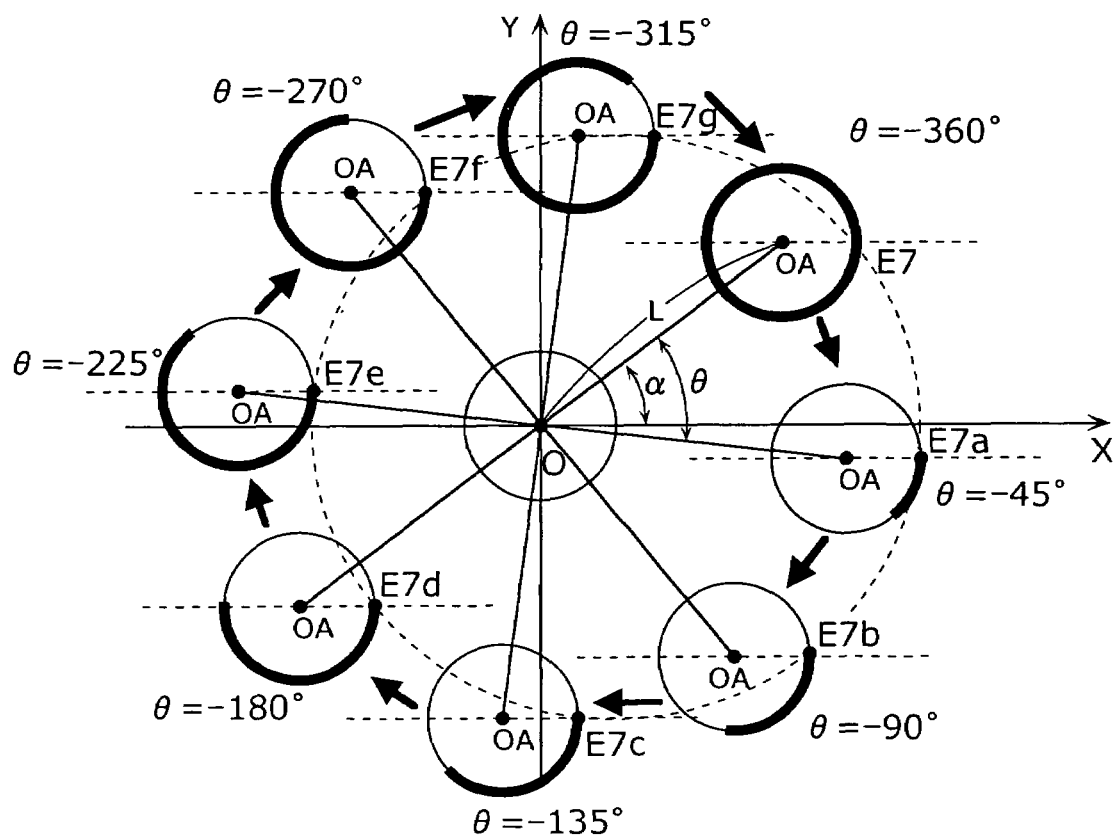
FIG. 13B is a diagram showing another orbit of the second sun-and-planet motion.

FIGS. 13A and 13B are diagrams showing orbits of the second sun-and-planet motion.

Here, FIG. 13A shows an orbit along which the tip of the cutting tool 103 moves from the moving point E7 when the work piece 20 rotates by the rotation angle θ (θ=−45 degrees). FIG. 13B shows an orbit along which the tip of the cutting tool 103 moves while the work piece 20 spins around 360 degrees.

For example, the NC control unit 106 attempts to move the tip of the cutting tool 103 from the moving point E7 along the circumference having the eccentric point OA in the center, while the work piece 20 spins around 360 degrees. Here, the eccentric point OA also rotates around the origin O during the rotation of the work piece 20. Therefore, when the work piece 20 rotates by −45 degrees, the NC control unit 106 attempts to move the tip of the cutting tool 103 to the point E7a along the orbit indicated by a dotted arrow shown in FIG. 13A. As a result, the tip of the cutting tool 103 moves on the work piece 20 while leaving the track (cutting track) indicated by boldface shown in FIG. 13A.

As is described above, the NC control unit 106 attempts to move the tip of the cutting tool 103 to the points E7b, E7c, ..., E7g and E7 along the orbit indicated by a dotted circular line shown in FIG. 13B, when the work piece 20 rotates by −90 degrees, −135 degrees, ..., -315 degrees and −360 degrees as shown in FIG. 13B. As a result, the tip of the cutting tool 103 moves on the work piece 20 while leaving the track (cutting track on the circumference having the eccentric point OA of the work piece 20 in the center) indicated by boldface.

The NC control unit 106 derives an orbit indicated by a function of the rotation angle θ using the coordinates of the moving point E7 so as to allow the tip of the cutting tool 103 to perform the above-mentioned movement (the second sun-and-planet motion).

For example, assuming that the coordinates (x7', z7') are coordinates of an offset point corresponding to the moving point E7, the coordinates (X, Y, Z) of the moving point E7 is expressed by Expression 5 based on Expression 4.

$$E7(X,Y,Z)=(x7'+L\cdot\cos\alpha, L\cdot\sin\alpha, z7') \quad \text{(Expression 5)}$$

When the work piece 20 rotates by the rotation angle θ, the eccentric point OA moves to the coordinates indicated by Expression 6 based on Expression 3.

$$OA(X,Y)=(L\cdot\cos(\alpha+\theta), L\cdot\sin(\alpha+\theta),0) \quad \text{(Expression 6)}$$

Here, when the tip of the cutting tool 103 performs the second sun-and-planet motion and the work piece 20 spins around 360 degrees, the tip of the cutting tool 103 needs to return to the moving point E7. Therefore, when the work piece 20 rotates by the rotation angle θ, the coordinates of the control point E in which the tip of the cutting tool 103 should be located shall be expressed by the expression (Expression 7).

$$E(X,Y,Z)=(x7'+L\cdot\cos\alpha, L\cdot\sin\alpha, z7') \quad \text{(Expression 7)}$$

By substituting each value of the rotation angle θ into Expression 7 indicated above, the NC control unit 106 generates control data indicating the coordinates of the control points E7a through E7g and the coordinates of the moving point E7.

FIG. 14 is a diagram showing an example of control data.

For example, by substituting each value of the rotation angle θ of −45 degrees, −90 degrees, ..., and −315 degrees, the NC control unit 106 derives the coordinates of the control points E7a through E7g along which the tip of the cutting tool 103 should be moved. As a result, the NC control unit 106 generates control data as indicated in FIG. 14.

Thus, the NC control unit 106 derives the orbit of the second sun-and-planet motion indicated by Expression 8, using the coordinates $(x_n'', Y_n'', z_n'')$ of the moving point, of each gullet, such as the moving point E7 out of other moving points.

$$\text{Orbit of the second sun-and-planet motion}(X,Y,Z)= (x_n'+L\cdot\cos(\alpha-\theta), L\cdot\sin(\alpha-\theta), z_n') \quad \text{(Expression 8)}$$

Note that the Expression 8 is obtained by generally rewriting the orbit (Expression 7) derived using the moving point E7, and the coordinates $(x_n', z_n')$ are the coordinates of the offset point corresponding to the moving point $(x_n'', Y_n'', z_n'')$.

The NC control unit 106 then generates control data as shown in FIG. 14 by substituting each value of the rotation angle θ into Expression 8 even for the moving point of another gullet other than the moving point E7.

After having allowed the tip of the cutting tool 103 to perform the second sun-and-planet motion as described above, that is, after the tip of the cutting tool 103 goes around along the circumference having the eccentric point OA in the center, the NC control unit 106 allows the tip of the cutting tool 103 to perform the third sun-and-planet motion.

For example, when the tip of the cutting tool 103 moves around for one time from the moving point E7 back to the moving point E7 on the circumference having the eccentric point OA in the center, the NC control unit 106 attempts to move the tip of the cutting tool 103 to the moving point E8 along the spiral having the eccentric OA in the center.

In this case, when the work piece 20 rotates by the rotation angle θ, the coordinates of the control point E in which the tip of the cutting tool 103 should be located is expressed by the following expression (Expression 9).

$$E(X,Y,Z)=(x7+L\cdot\cos(\alpha-\theta), L\cdot\sin(\alpha-\theta), z7'+(z8'-z7')\times\theta/360°) \quad \text{(Expression 9)}$$

Note that z8' in Expression 9 is a Z coordinate of the offset point (diffraction point) corresponding to the moving point E8.

Thus, the NC control unit 106 derives the orbit indicated by the third sun-and-planet motion (Expression 10) using the coordinates $(x_n'', Y_n'', z_n'')$ of the moving point, of each gullet, such as the moving point E7 out of plural moving points.

$$\text{The orbit of the third sun-and-planet motion}(X,Y,Z)= ((x_n'+L\cdot\cos(\alpha-\theta), L\cdot\sin(\alpha-\theta), z_n')+(z_{n+1}'-z_n')\times\theta/360°) \quad \text{(Expression 10)}$$

Note that $z_{n+1}'$ in Expression 10 represents Z coordinate of the diffraction point that belongs to the same offset step part PB' as that of the offset point $(x_n', z_n')$ corresponding to the moving point $(x_n'', Y_n'', z_n'')$.

The NC control unit 106 then generates control data as indicated in FIG. 14 by substituting each value of the rotation angle θ into Expression 10 for each moving point of the gullet.

Figure 15A:
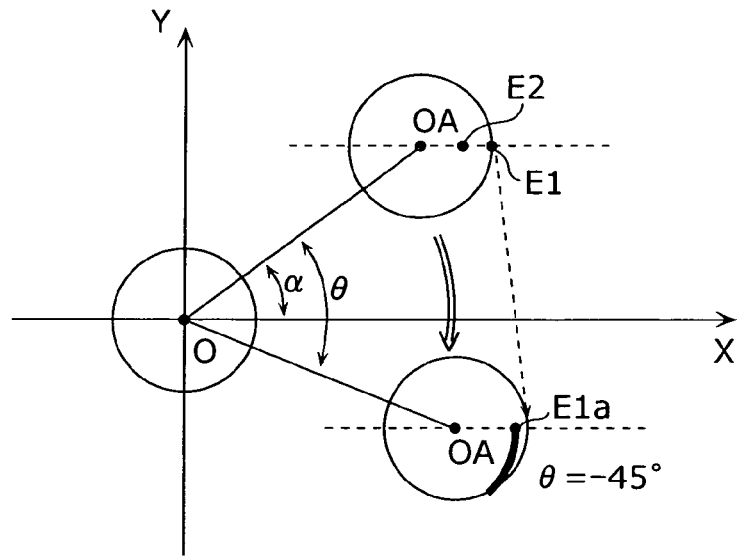
FIG. 15A is a diagram showing an orbit of the first sun-and-planet motion.
Figure 15B:
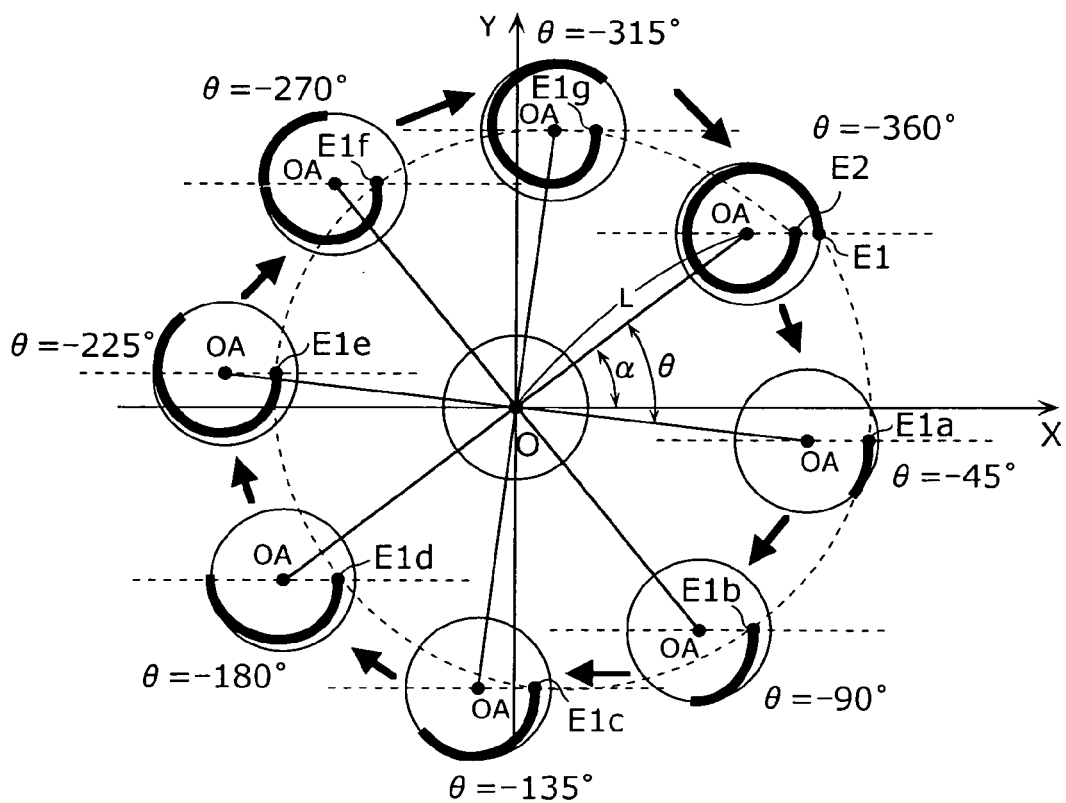
FIG. 15B is a diagram showing another orbit of the first sun-and-planet motion.

FIGS. 15A and 15B are diagram showing an orbit of the first sun-and-planet motion.

Here, FIG. 15A shows an orbit along which the tip of the cutting tool 103 moves from the moving point E1 when the work piece 20 rotates by the rotation angle θ (θ=−45 degrees). FIG. 15B shows an orbit along which the tip of the cutting tool 103 moves from the moving point E1 to the moving point E2 when the work piece 20 spins around 360 degrees.

For example, the NC control unit 106 attempts to move the tip of the cutting tool 103 from the moving point E1 to the moving point E2 on the side of the eccentric point OA along the spiral while the work piece 20 spins around 360 degrees, towards a deeper direction (smaller direction in the Z axis direction) with respect to the depth of the work piece 20. Here, when the work piece 20 rotates by −45°, the NC control unit 106 attempts to move the tip of the cutting tool 103 to the point E1a along the orbit indicated by the dotted arrow shown in FIG. 15A. As a result, the tip of the cutting tool 103 moves on the work piece 20 in such a manner to leave the track (cutting track) indicated by boldface shown in FIG. 15A.

As is described above, the NC control unit 106 attempts to move the tip of the cutting tool 103 to the point E1b, E1c, . . . , E1g and back to E1 along the orbit indicated by the dotted circular line shown in FIG. 15B when the work piece 20 rotates by −90°, −135°, . . . , −315° and −360°, as shown in FIG. 15B. As a result, the tip of the cutting tool 103 moves on the work piece 20 while leaving the track (cutting track) of the spiral indicated by boldface as shown in FIG. 15B.

In order to cause the tip of the cutting tool 103 to perform the above-mentioned movement (the first sun-and-planet motion), the NC control unit 106 derives the orbit indicated by a function of the rotation angle θ, using the coordinates of the moving point E1.

Here, when the tip of the cutting tool 103 performs the first sun-and-planet motion from the moving point E1 and the work piece 20 spins around 360 degrees, the tip of the cutting tool 103 needs to reach the moving point E2. Therefore, the coordinates of the control point E, in which the tip of the cutting tool 103 located in the moving point E1 should be located when the work piece 20 rotates by the rotation angle θ, is expressed by the expression (Expression 11).

$$E(X,Y,Z)=(x1'+L\cdot\cos(\alpha-\theta)-(x1'-x2')\times\theta/360, L\cdot\sin(\alpha-\theta), z1'-|z1'-z2'|\times\theta/360°)$$ (Expression 11)

In Expression 11, the coordinates (x1', z1') are the coordinates of the offset point corresponding to the moving point E1, while the coordinates (x2', z2') are the coordinates of the offset point corresponding to the moving point E2.

Thus, the NC control unit 106 derives the orbit expressed by the expression (Expression 12) of the first sun-and-planet motion, using the coordinates $(x_{n+m}'', Y_{n+m}'', z_{n+m}'')$ of each moving point of the gullet, such as the moving point E7.

$$\text{The orbit of the first sun-and-planet motion}(X,Y,Z)= \\ (x_{n+m}'+L\cdot\cos(\alpha-\theta)-(x_{n+m}'-x_{n+m+1}')\times\theta/360°, L\cdot\sin \\ (\alpha-\theta), z_{n+m}'-|z_{n+m}'-z_{n+m+1}'|\times/360°)$$ (Expression 12)

Note that the coordinates $(x_{n+m+1}', z_{n+m+1}')$ are the coordinates of the offset point that is the nearest to the origin O (eccentric point OA) from the offset point $(x_{n+m}', z_{n+m}')$. Also, Expression 12 is obtained by generally rewriting the orbit (Expression 11) derived using the moving point E1.

The NC control unit 106 then derives the coordinates of the control point by substituting each value of the rotation angle θ into Expression 12 for each moving point except for the moving point of gullet, and generates the control data as shown in FIG. 14.

Thus, in the embodiment, the NC control unit 106 calculates the orbit along which the tip of the cutting tool 103 should be moved, as a function of the rotation angle θ for each sun-and-planet motion, and generates control data by substituting a value in the rotation angle θ.

Then, the NC control unit 106 allows the cutting tool 103 to cut the work piece 20 by moving the center of the tip of the cutting tool 103 to the coordinates of the control point indicated by the control data. As a result, the concave part 21 is formed in a part other than the center of the rotation of the work piece 20. The NC control unit 106 fabricates the metal mold 20a of diffractive lens arrays, as shown in FIG. 2, by forming plural concave portions 21.

Furthermore, according to the embodiment, a diffractive lens array is injection-molded using the thus fabricated metal mold 20a.

Figure 16:
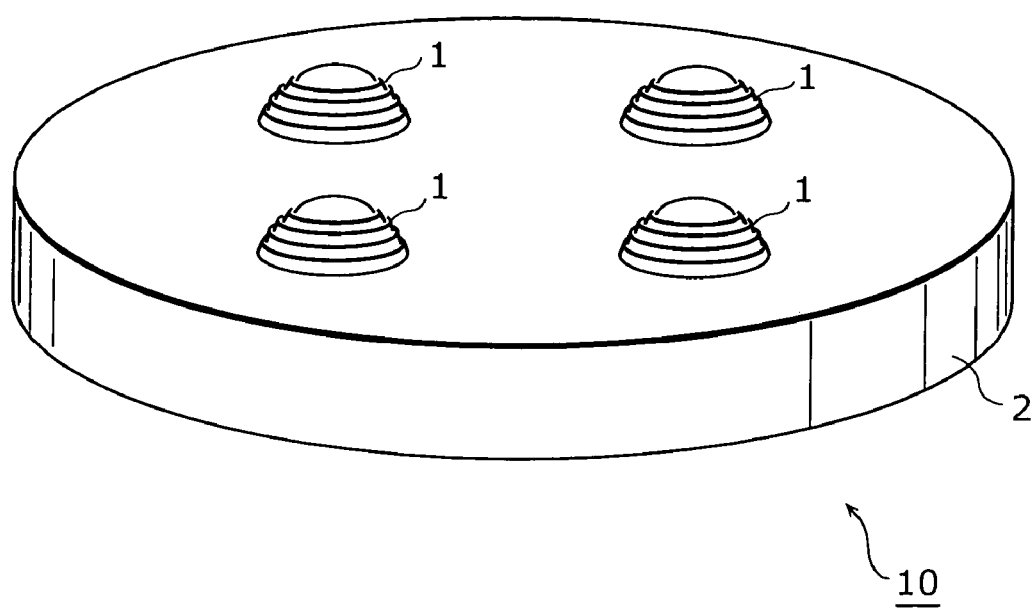
FIG. 16 is an external view of a diffractive lens array.

FIG. 16 is an external view of the diffractive lens array manufactured by the method according to the embodiment.

A diffractive lens array 10 is comprised of the following in an integrated manner: a base 2; and four diffractive lenses 1 arranged on the base. The four diffractive lenses 1 are arranged so that the respective lenses are equally distant from the center of the base 2 and are placed at regular intervals. Also, the diffractive lens 1 is formed so that the diffractive lens 1 fits in the concave portion 21 of the metal mold 20a.

Thus, according to the embodiment, since the metal mold 20a is fabricated by moving the cutting tool 103 along the plural kinds of orbits, it is possible to manufacture the metal mold 20a having a smooth curved surface and a sharp form. Therefore, by molding the diffractive lens array 10 using such a metal mold 20a, it is possible to manufacture a saw-tooth shaped diffractive lens array 10 having a smooth curved surface and a sharp form.

Also, in the embodiment, the rotation and movement performed by the processing apparatus 100 are carried out with submicron accuracy. Therefore, it is possible to manufacture the metal mold 20a with submicron accuracy, and thus to reduce the difference among the forms of the diffractive lens arrays and the placements of the diffractive lenses to the extent as less as the difference at submicron accuracy level.

In the embodiment, the orbits as expressed by Expression 8, Expression 10 and Expression 12 are derived. Therefore, it is possible to form the concave portion 21 in an arbitrary position of the work piece 20 by changing the distance L and the angle α.

Also, in the embodiment, the surface of the diffractive lens other than a step part is made smoother compared with the method based on the lithography technology, and thereby, it is possible to enhance the optical performance of the lens.

According to the embodiment, control data is generated, the metal mold 20a is fabricated according to the control data, and a diffractive lens array is manufactured through injection molding using the metal mold 20a. Therefore, it is possible to decrease the number of processes for manufacturing the diffractive lens arrays and thus to improve production efficiency, compared with the manufacturing method based on the lithography technology.

The mold manufacturing method according to the present invention produces an effect of enabling the manufacturing of the mold with which a diffractive lens array of high accuracy can be molded. Such a mold manufacturing method can be applied, for example, to the system of manufacturing diffractive lens arrays for use in autofocus cameras.

As has been described above, the method for manufacturing optical elements and the method for manufacturing a mold thereof are described in the embodiment. The present invention, however, is not limited to this.

In the embodiment, for example, four concave portions 21 are formed on the work piece 20, but the number of the concave portions 21 may be other than four. It is thus possible to manufacture a diffractive lens array having one, three or five diffractive lenses.

According to the embodiment, plural concave portions 21 are placed on a concentric circle. However, instead of such a placement, the form of the respective concave portions 21 may be different from each other. With this, it is possible to manufacture various kinds of diffractive lens arrays.

In the embodiment, the concave portion 21 such as that fits in a spherical diffractive lens is formed on the work piece 20. However, the concave portion 21 such as that fits in an aspherical diffractive lens may be formed.

It is desirable that the radius tr of the R shape in the tip of the cutting tool 103 is higher than the height of an ideal gap of the surface of the concave portion 21 on the metal mold 20a. In the case of using the cutting tool 103 having a tip whose radius is larger than the height of the step, the diffraction efficiency of a diffractive lens array is 80% or lower and such a diffractive lens array is not usable as a product.

Figure 17A:
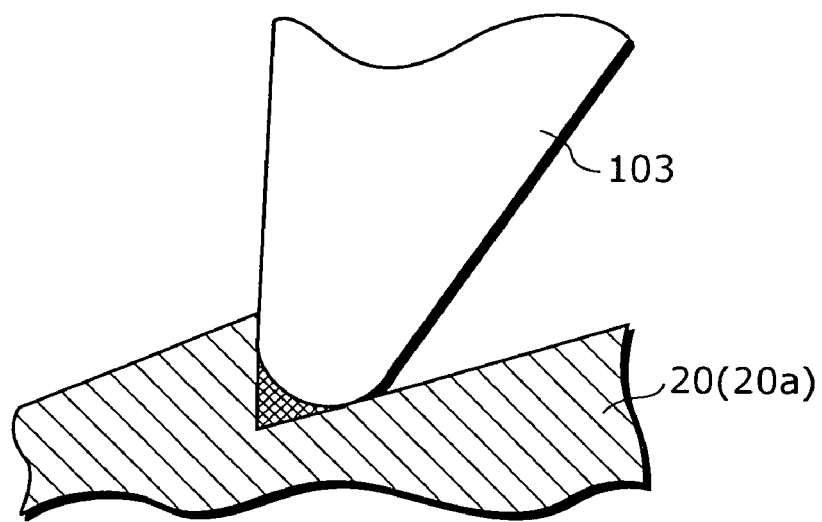
FIG. 17A is a diagram showing examples of a tip of a cutting tool and a part of the cross-sectional view of the concave portion.
Figure 17B:
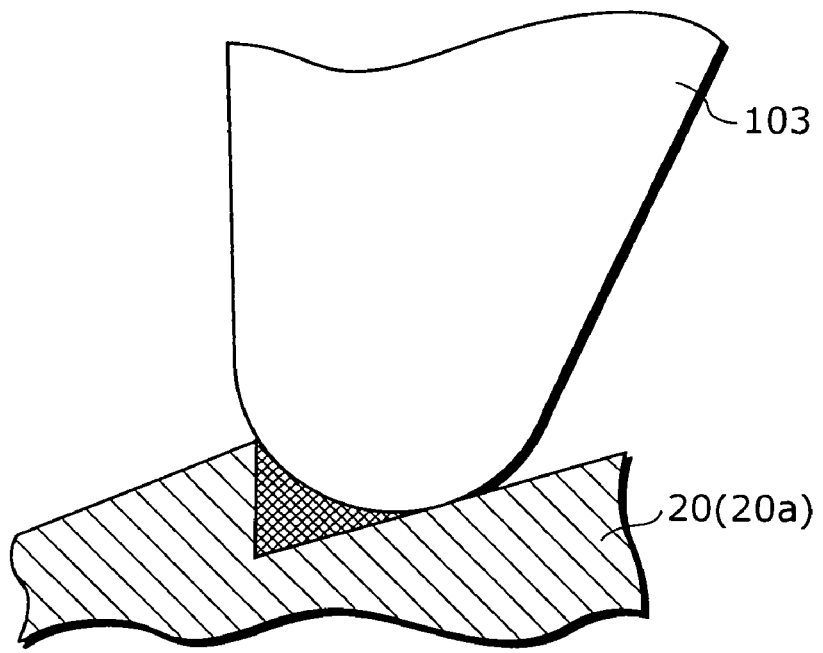
FIG. 17B is a diagram showing other examples of a tip of cutting tool and a part of the cross-sectional view of the concave portion.

FIGS. 17A and 17B are diagrams respectively showing the tip of the cutting tool 103 and a partial cross-section of the concave portion 21.

In the case of using the cutting tool 103 with the tip whose radius is smaller than the height of an ideal step, the surface of the concave portion 21 can have the form identical to an ideal saw-toothed form, as shown in FIG. 17A. As a result, it is possible to manufacture a diffractive lens array having satisfactory diffraction efficiency.

On the other hand, in the case of using the cutting tool 103 with the tip whose radius is larger than the height of the ideal step, the surface of the concave portion 21 does not have the ideal saw-toothed form but a wavy form as shown in FIG. 17B. As a result, a diffractive lens array with low diffraction efficiency is to be manufactured.

It is also preferable that the distance between the moving points (e.g., a distance between an X coordinate of the moving point E1 and an X coordinate of the moving point E2 as shown in FIGS. 15A and 15B) is smaller than a predetermined distance. In other words, in the case where the distance between the moving points is long, when the tip of the cutting tool 103 performs the above-mentioned first sun-and-planet motion, the surface of the concave portion 21 of the metal mold 20a does not get smoothly-curved but unleveled. As a result, the performance of the diffractive lens array is decreased.

It is therefore desirable to derive the distance P between the moving points by the expression $P=|x_n"-x_{n+1}"|=(8 \cdot n \cdot tr)^{1/2}$. Note that n satisfies the condition of $0 \leq n \leq 20$ [nm].

Also, according to the embodiment, for deriving the coordinates of the control point as shown in FIG. 14, for example, the value of the rotation angle $\theta$ is varied by 45 degrees as in −45 degrees, −90 degrees, −135 degrees, . . . , and the value of each rotation angle $\theta$ is substituted into a function indicating an orbit. However, as the tip of the cutting tool 103 moves between the control points while forming a straight line, the concave portion 21 will not have an ideal form because the interval between the values of the rotation angles $\theta$ to be substituted in the function is broad, that is, the number of control points is small. For example, in the case of varying the value of the rotation angle $\theta$ by 10 degrees, and deriving the coordinates of the control point using such values, radiological lines gets into the surface which is to form the curved surface of the concave portion 21 and the step is deformed. As a result, the form accuracy and the diffraction efficiency of the diffractive lens array are decreased.

Therefore, it is desirable that the interval $\theta a$ at which the rotation angle $\theta$ varies satisfies $0<\theta a \leq 5$. By thus varying the rotation angle $\theta$ per interval $\theta a$ and substituting each rotation angle $\theta$ in the function so as to derive the coordinates of the control points, the form of the concave portion 21 can be satisfactory. Also, defining that the interval $\theta a$ is 1 degree, the form of the concave portion 21 can be rendered more satisfactory.

The moving speed of the tip of the cutting tool 103 needs to be between 5 mm/min and 500 mm/min. For example, in the case where the moving speed is at 600 mm/min, the NC control unit 106 becomes incapable of controlling the movement of the cutting tool 103 in the X-axis, Y-axis and Z-axis directions with submicron accuracy. As a result, it is impossible to manufacture the metal mold 20a having a form with high accuracy. In contrast, in the case where the moving speed is slower than 5 mm/min, chipping is caused at the tip of the cutting tool 103 and the concave portion 21 cannot be processed. Therefore, it is necessary that the cutting tool 103 moves at the speed as described above.

Also, in the embodiment, when offset conversion is performed, a radius of the circle which passes three form points in the sequence part PA and the coordinates of the center of the circle are used. However, offset conversion can be performed without using them. For example, the alignment of the form points in the sequence part PA are expressed by a function f(X), a normal direction of the function f(X) is derived, and offset conversion is performed using the normal direction. Even with such an offset conversion, it is possible to obtain the same effects as described above.

According to the embodiment, the concave portion 21 is formed on the work piece 20 so that each diffractive lens 1 of the diffractive lens array 10 has a concave form. However, the concave portion 21 may be formed so that each diffractive lens 1 has a concave form or asymmetric form. In other words, in order to form the diffractive lens 1 with a convex form, one or more convex portions having a saw-toothed surface can be formed. In such a case, the same effects as described above can be obtained.

It is described in the embodiment that the metal mold 20a is fabricated so as to manufacture the diffractive lens array 10. However, by cutting lens materials such as resin and glass with the cutting tool 103, the diffractive lens array 10 may be manufactured without using the metal mold 20a.

The following describes the diffractive lens array 10 which is injection-molded using the metal mold 20a manufactured by the mold manufacturing method according to the embodiment.

In the embodiment, the rotation and movement performed by the processing apparatus 100 are carried out with the accuracy of 0.1 μm or less. Therefore, in the case where the distance between the concave portions 21 of the metal mold 20 is, for instance, 1.5 mm, an error of the distance can be reduced so as to fall within ±0.1 μm. In other words, with the metal mold 20a, an error of the distance between the concave portions 21 can be reduced so as to fall within 0.0067% as derived by ±0.1/(1.5×1000)×100=0.0067. According to the embodiment, in order to set the work piece 20 on the processing apparatus 100 and form the concave portions 21 on the surface of the work piece 20, it is possible to align the concave portions 21 on the same plane. Therefore, a degree of parallelization of a central axis of each of the concave portions 21 is parallel, that is, an angle between the central axes can be reduced so as to fall within 0.0015 degrees.

Consequently, with the diffractive lens array 10 injection-molded using the metal mold 20a manufactured by the method according to the embodiment, the diffractive lenses 1 can have the same form. In addition, an error of the difference between the diffractive lenses 1, which shall be 1.5 mm, can be reduced so as to fall at least within ±0.25 μm. That is to say that, with the diffractive lens array 10, the error of the distance between the diffractive lenses 1 can be reduced so as to fall within 0.017% as derived by ±0.25/(1.5×1000)×100=0.017. Furthermore, the degree of parallelization of the optical axis of each diffractive lens 1, or in other words, an angle between the optical axes can be reduced so as to fall within 0.003 degrees.

Figure 18:
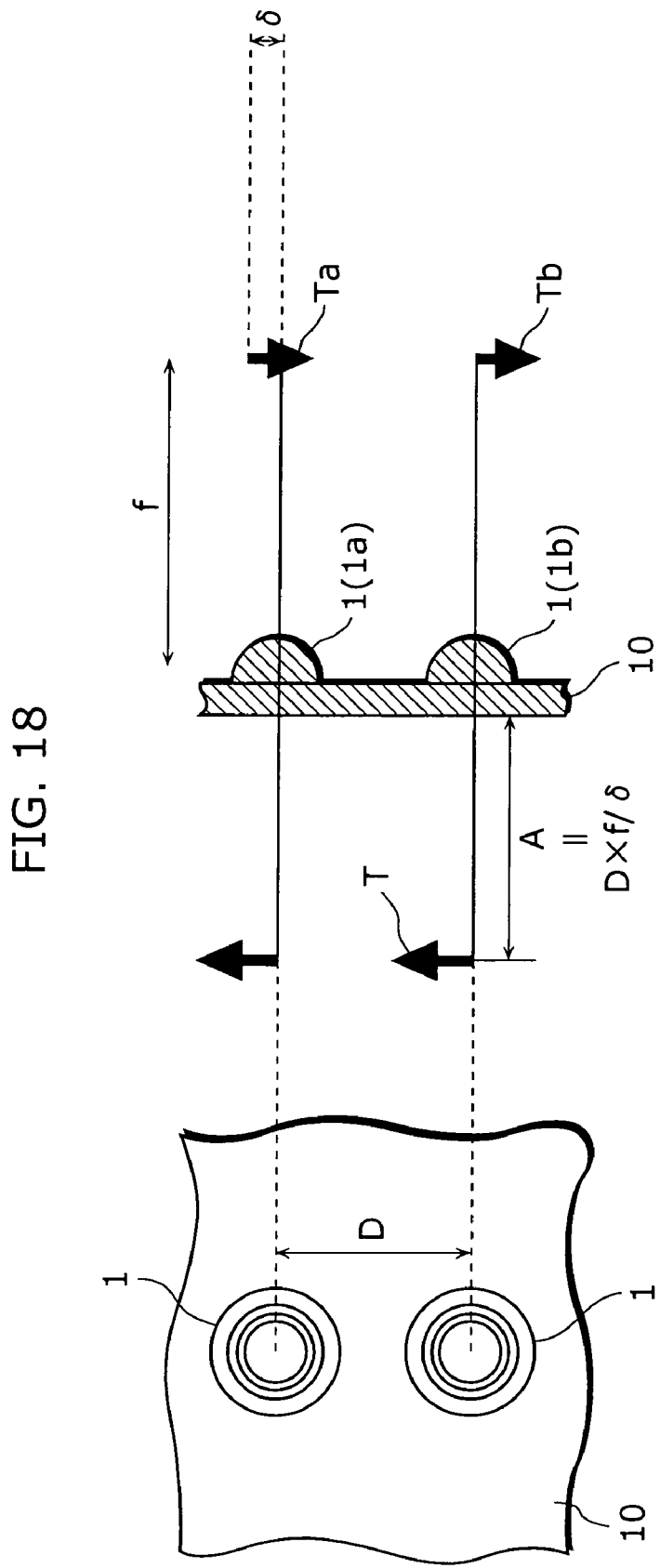
FIG. 18 is a diagram for illustrating an application of a diffractive lens array.

FIG. 18 is a diagram illustrating an application of the diffractive lens array 10.

The diffractive lens array 10 is used, for example, for measuring a distance to an object. Assuming here that f denotes the respective focal lengths between the diffractive lens array 10 and the diffractive lenses 1a (1) and 1b(1), D denotes a distance between the diffractive lenses 1a and 1b, and A denotes a distance from the diffractive lens array 10 to an object T. Also, δ represents a difference between Ta, which is an image reflected through the diffractive lens array 1a, and Tb which is an image reflected by the diffractive lens array 1b.

In such a case, the distance A is calculated by A=D×f/δ. In other words, with the diffractive lens array 10 injection-molded using the metal mold 20a manufactured by the method according to the embodiment, the error of the distance D between the diffractive lenses 1a and 1b is extremely small so that it is possible to measure exact length of the distance A to the object T.

Figure 19:
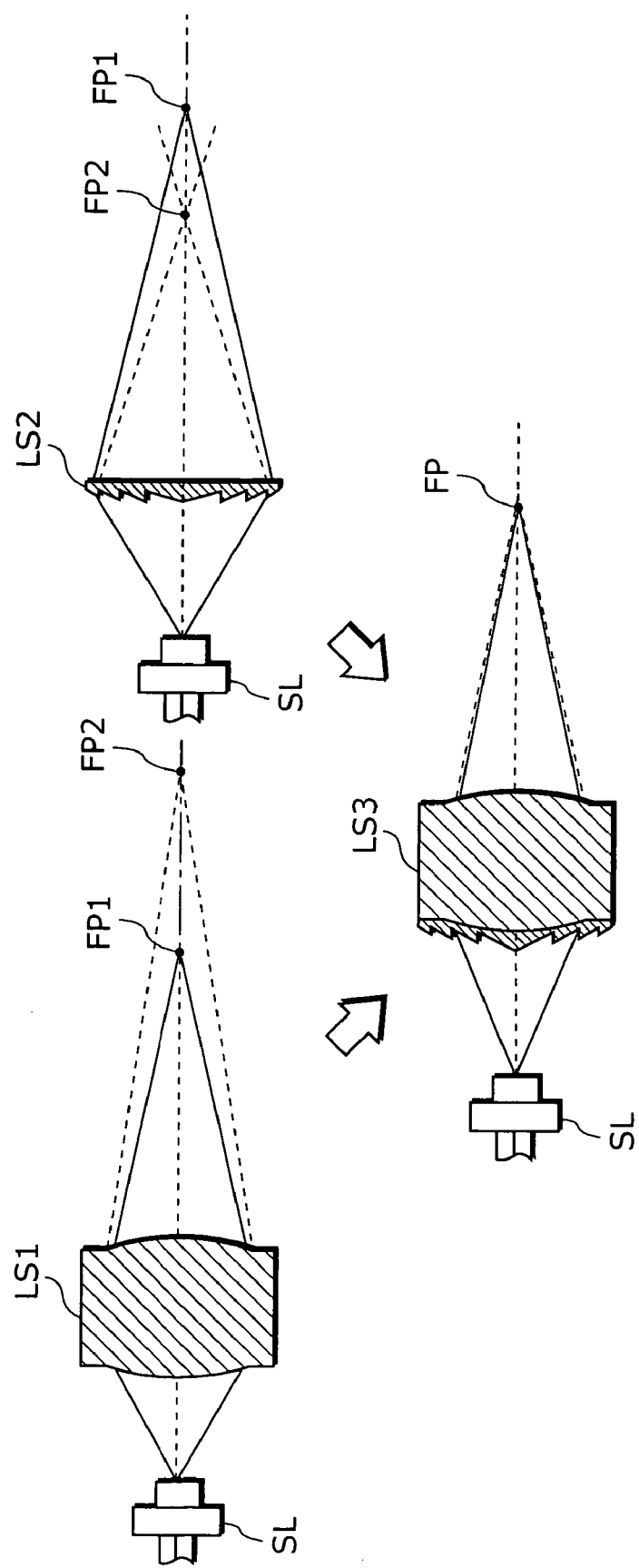
FIG. 19 is a diagram for illustrating features of an aspherical lens equipped with a diffraction grating.

FIG. 19 is a diagram illustrating a feature of an aspherical lens equipped with a diffraction grating.

Generally speaking, with an aspherical lens (refractive lens) LS1 that is not equipped with a diffraction grating or a simple diffraction grating (diffractive lens) LS2, a focal length varies according to wavelength variation of light. Note that the wavelength variation of light is induced by the change in temperature of a semiconductor laser device SL which outputs the light.

In the refractive lens LS1, if the temperature of the semiconductor laser device SL increases, that is, the wavelength of the light gets longer, a focal point shifts from a position FP1 at normal temperature to a position FP2 and the focal length gets longer.

On the other hand, in the diffractive lens LS2, if the temperature of the semiconductor laser device SL rises, that is, the wavelength of the light gets longer, the focal point shifts from the position FP1 at normal temperature to the position FP2 and the focal length gets shorter.

Here, an aspherical lens with diffraction grating (diffraction-grating-attached aspherical lens) LS3 is configured by the combination of the refractive lens LS1 and the diffractive lens LS2, so that the aspherical lens LS3 has the both features of the lenses LS1 and LS2. In other words, the diffraction-grating-attached aspherical lens LS3 has the feature that the focal length lets longer as the temperature rises in the refractive lens LS1 as well as the feature that the focal length gets shorter as the temperature rises in the diffractive lens LS2. Therefore, in the diffraction-grating-attached aspherical lens LS3, the focal length does not change due to temperature change and the focal point is fixed to the position FP irrespective of temperature change.

Each of the diffractive lenses 1 of the diffractive lens array 10, which is injection-molded using the metal mold 20a manufactured by the method according to the embodiment, has the same form as the diffraction-grating-attached aspherical lens LS3. Therefore, in each diffractive lens 1 of the diffractive lens array 10 injection-molded according to the embodiment, the same focal point can be maintained disregarding temperature change. With the diffractive lens 1, it is possible to reduce variation in the focal point or variation in the focal length due to chromatic or thermal aberration, as well as to measure exactly the distance A when the diffractive lens 1 is used for the measurement of the distance to the object T, as shown in FIG. 18.

Figure 20:
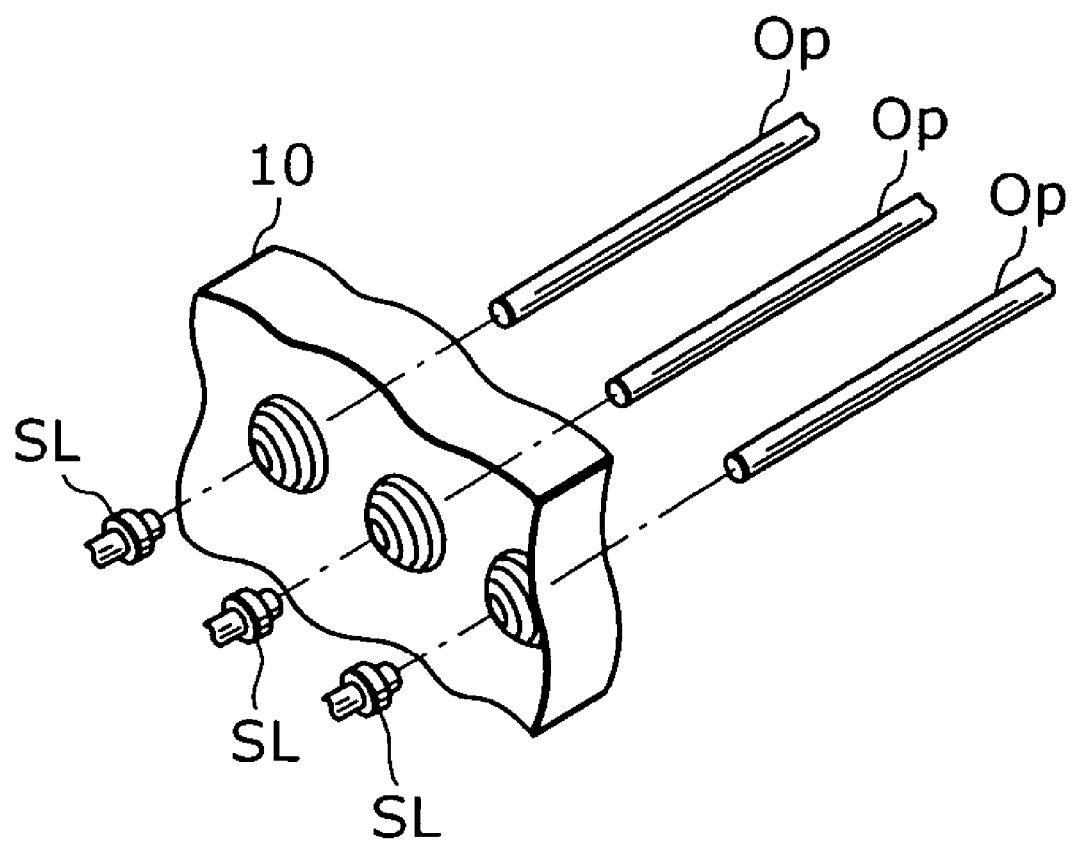
FIG. 20 is a diagram for describing another application of a diffractive lens array.

FIG. 20 is a diagram for describing another application of the diffractive lens array 10.

Such a diffractive lens array 10 is used as an optical fiber combined optical element as such that introduces the light irradiated from the semiconductor laser device SL into an optical fiber Op. The diffractive lens array 10 can be used in various applications such as a light emitting and receiving element for optical communication or the like. Even in such a use, the diffractive lens array 10 can reduce the influence subjected to an error in size and form as well as the influence subjected to the change in temperature or wavelength.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

What is claimed is:

1. A method for manufacturing a mold comprising:

creating a set of form coordinates representing a concave or convex portion;

deriving a set of movement coordinates by moving the form coordinates;

deriving a plurality of orbits for forming the concave or convex portion, based on the movement coordinates, for causing a cutting tool to perform a sun-and-planet movement; and fabricating a mold by forming the concave or convex portion, on or in, respectively, a member having a central axis by causing the cutting tool to perform the sun-and-planet movement along a combination of the orbits while rotating the member about the central axis so as to cut the member, the concave or convex portion having a center that does not match the central axis, wherein said deriving the plurality of orbits comprises deriving a first orbit which revolves around the central axis of the member and which connects two movement coordinates so as to cause the cutting tool to draw a spiral at a position away from the central axis, either from an outer periphery of the concave or convex portion toward the center or from the center toward the outer periphery of the concave or convex portion, and deriving a second orbit which revolves around the central axis of the member and causes the cutting tool to draw a circle at a position away from the central axis from a first movement coordinate to the first movement coordinate.

2. The method according to claim 1, wherein when tr denotes a radius of a spherical tip of the cutting tool which makes contact with the member, said deriving the set of movement coordinates comprises deriving the movement coordinates so that the distance between neighboring movement coordinates on a plane vertical to a depth direction of cutting satisfies $(8 \cdot n \cdot tr)^{1/2}$, where $0 \leq n \leq 20 \times 10^{-9}$.

3. The method according to claim 1, wherein a plurality of concave or convex portions are formed on the member.

4. A method for manufacturing an optical element comprising:

creating a set of form coordinates representing a concave or convex portion;

deriving a set of movement coordinates by moving the form coordinates;

deriving a plurality of orbits for forming the concave or convex portion, based on the movement coordinates for causing a cutting tool to perform a sun-and-planet movement;

fabricating a mold by forming the concave or convex portion, on or in, respectively, a member having a central axis by causing the cutting tool to perform the sun-and-planet movement along a combination of the orbits while rotating the member about the central axis so as to cut the member, the concave or convex portion having a center that does not match the central axis; and molding the optical element using the fabricated mold, wherein said deriving the plurality of orbits comprises deriving a first orbit which revolves around the central axis of the member and which connects two movement coordinates so as to cause the cutting tool to draw a spiral at a position away from the central axis, either from an outer periphery of the concave or convex portion toward the center or from the center of the concave or convex portion toward the outer periphery of the concave or convex portion, and deriving a second orbit which revolves around the central axis of the member and causes the cutting tool to draw a circle at a position away from the central axis from a first movement coordinate to the first movement coordinate.

* * * * *

UNITED STATES PATENT AND TRADEMARK OFFICE
CERTIFICATE OF CORRECTION

PATENT NO. : 7,561,333 B2  Page 1 of 1
APPLICATION NO. : 11/585935
DATED : July 14, 2009
INVENTOR(S) : Takasu et al.

It is certified that error appears in the above-identified patent and that said Letters Patent is hereby corrected as shown below:

IN THE CLAIMS

In column 16, claim 2, line 59, "$0 \leq n \leq 20 \times 10^{-9}$" should read --$0 < n \leq 20 \times 10^{-9}$--.

Signed and Sealed this

Twenty-ninth Day of December, 2009

David J. Kappos
*Director of the United States Patent and Trademark Office*